US008690414B2

(12) United States Patent  
Tomotoshi et al.

(10) Patent No.: US 8,690,414 B2  
(45) Date of Patent: Apr. 8, 2014

(54) DISPLAY DEVICE WITH LIGHT GUIDE ELEMENT OVERLAPPING PERIPHERIAL DISPLAY REGION OF DISPLAY PANEL

(75) Inventors: Takuma Tomotoshi, Osaka (JP); Hisashi Watanabe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 338 days.

(21) Appl. No.: 13/256,464

(22) PCT Filed: Mar. 15, 2010

(86) PCT No.: PCT/JP2010/001836  
§ 371 (c)(1),  
(2), (4) Date: Sep. 14, 2011

(87) PCT Pub. No.: WO2010/106782  
PCT Pub. Date: Sep. 23, 2010

(65) Prior Publication Data  
US 2012/0008340 A1 Jan. 12, 2012

(30) Foreign Application Priority Data

Mar. 18, 2009 (JP) ................................. 2009-067039

(51) Int. Cl.  
*G09F 13/08* (2006.01)  
*G02F 1/13357* (2006.01)

(52) U.S. Cl.  
USPC .......................................... 362/616; 362/628

(58) Field of Classification Search  
USPC .................................. 362/616, 628  
See application file for complete search history.

(56) References Cited

U.S. PATENT DOCUMENTS

| 4,139,261 | A | 2/1979 | Hilsum |
| 5,251,280 | A | 10/1993 | Asada et al. |
| 5,594,561 | A | 1/1997 | Blanchard |
| 5,801,797 | A | 9/1998 | Iida et al. |
| 6,005,649 | A | 12/1999 | Krusius et al. |

(Continued)

FOREIGN PATENT DOCUMENTS

| JP | 52-93351 A | 8/1977 |
| JP | 61-120195 A | 6/1986 |

(Continued)

OTHER PUBLICATIONS

Official Communication issued in International Patent Application No. PCT/JP2010/001836, mailed on May 25, 2010.

(Continued)

*Primary Examiner* — David V Bruce  
(74) *Attorney, Agent, or Firm* — Keating & Bennett, LLP

(57) ABSTRACT

A plurality of display panels include a display region and a frame region. The plurality of display panels include first and second display panels adjoining each other; the frame region of the first display panel is overlapped by a side face of the second display panel so that an angle defined by viewer-side surfaces is more than 0° but less than 180°; first and second light guide elements are disposed on the viewer's side of peripheral display regions; the light guide elements have incident and outgoing faces and a plurality of light guiding portions; the distance between the incident and outgoing faces increases away from the peripheral display region toward the frame region; the volume of the first light guide element is larger than that of the second light guide element; and the outgoing faces of the first and second light guide elements are covered by a functional film.

9 Claims, 25 Drawing Sheets

(56) References Cited

U.S. PATENT DOCUMENTS

| | | |
|---|---|---|
| 6,144,425 A | 11/2000 | Kawabata et al. |
| 6,459,462 B1 | 10/2002 | Seraphim et al. |
| 6,483,482 B1 | 11/2002 | Kim |
| 7,223,007 B1 * | 5/2007 | Fredley et al. ................ 362/616 |
| 2006/0077544 A1 | 4/2006 | Stark |
| 2009/0059366 A1 | 3/2009 | Imai |
| 2009/0085831 A1 | 4/2009 | Odoi et al. |
| 2011/0025594 A1 | 2/2011 | Watanabe |

FOREIGN PATENT DOCUMENTS

| | | |
|---|---|---|
| JP | 05-005873 A | 1/1993 |
| JP | 07-056158 A | 3/1995 |
| JP | 07-128652 A | 5/1995 |
| JP | 09-130701 A | 5/1997 |
| JP | 09-319314 A | 12/1997 |
| JP | 2000-056713 A | 2/2000 |
| JP | 2000-347587 A | 12/2000 |
| JP | 2001-005414 A | 1/2001 |
| JP | 2005-091873 A | 4/2005 |
| JP | 2009-104112 A | 5/2009 |
| JP | 2009-198688 A | 9/2009 |
| WO | 2008/122978 A2 | 10/2008 |
| WO | 2009/122691 A1 | 10/2009 |
| WO | 2010/016194 A1 | 2/2010 |

OTHER PUBLICATIONS

Watanabe, "Display Device," U.S. Appl. No. 13/056,191, filed Jan. 27, 2011.

Watanabe, "Display Device," U.S. Appl. No. 13/129,428, filed Jun. 2, 2011.

English translation of Official Communication issued in corresponding International Application PCT/JP2010/001836, mailed on Oct. 27, 2011.

* cited by examiner

FIG.4
(a)
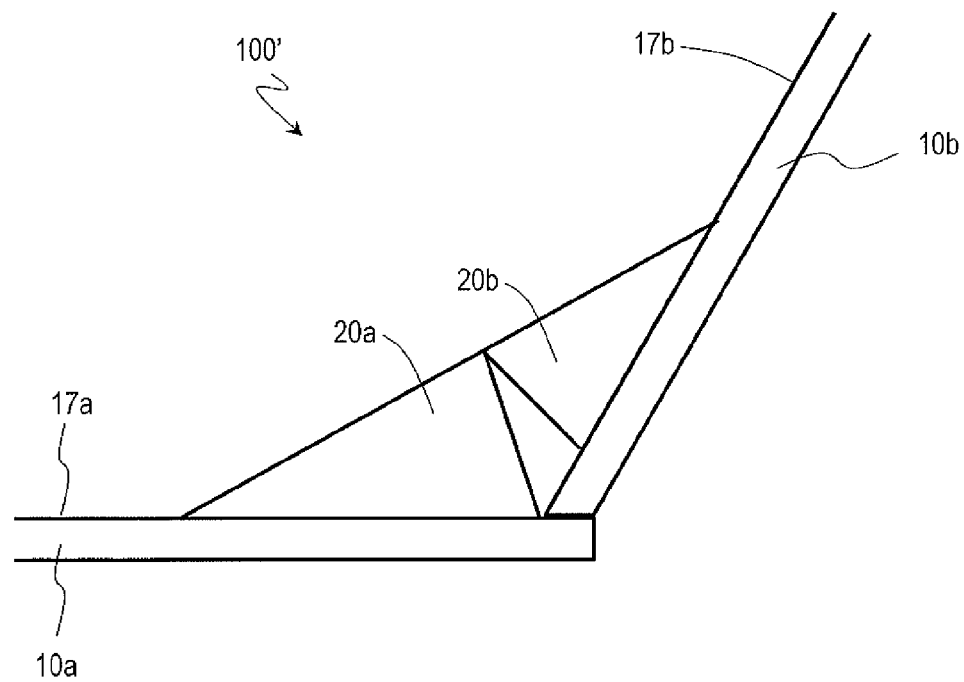
(b)
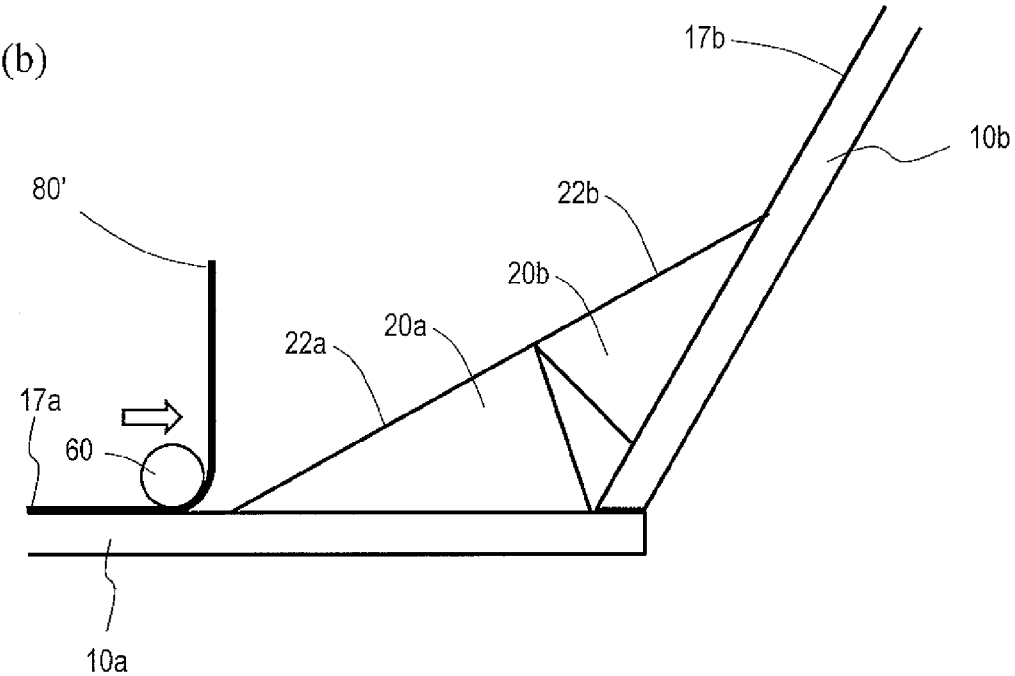

FIG.8
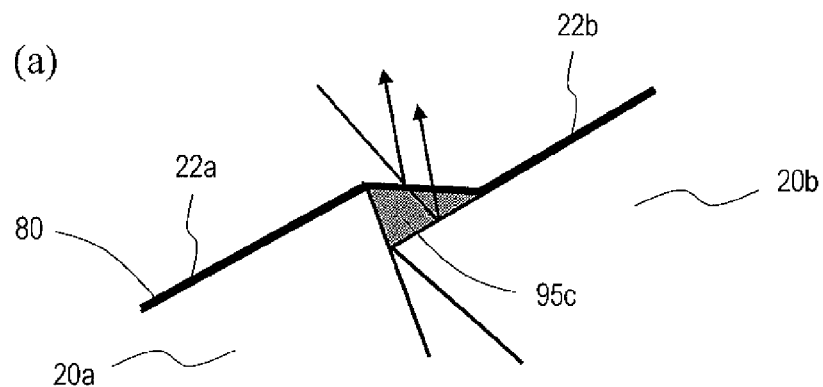
(a)
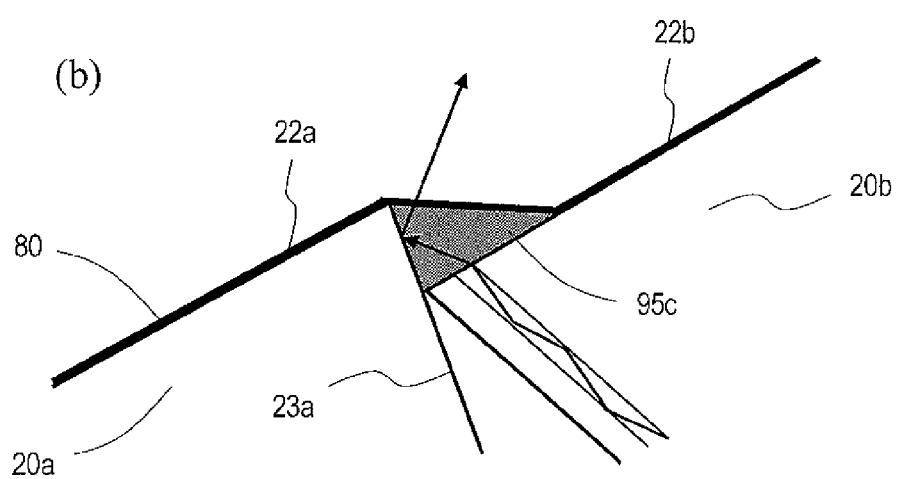
(b)
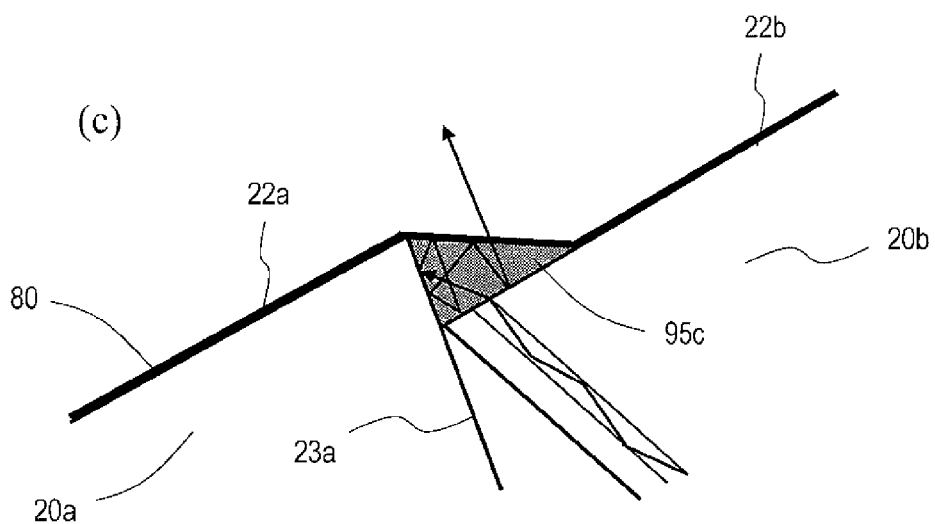
(c)

FIG.9
(a)
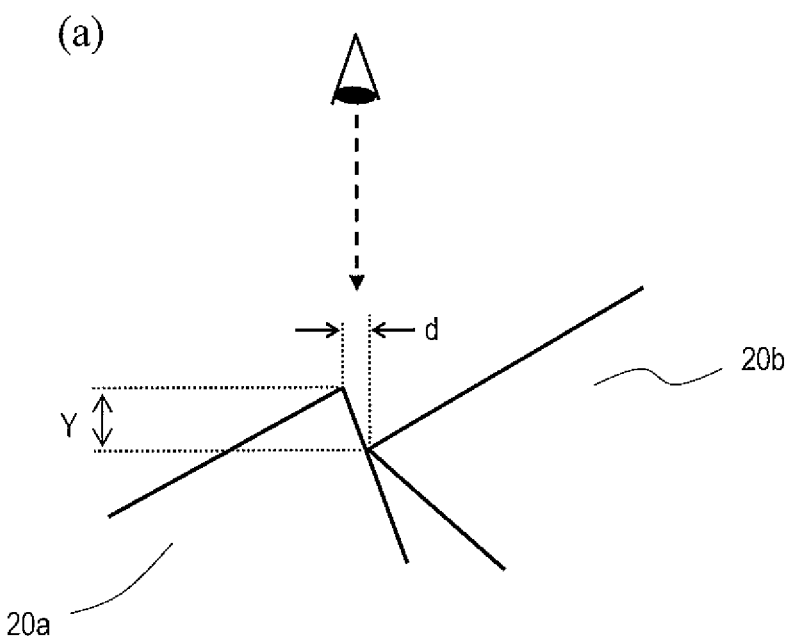
(b)
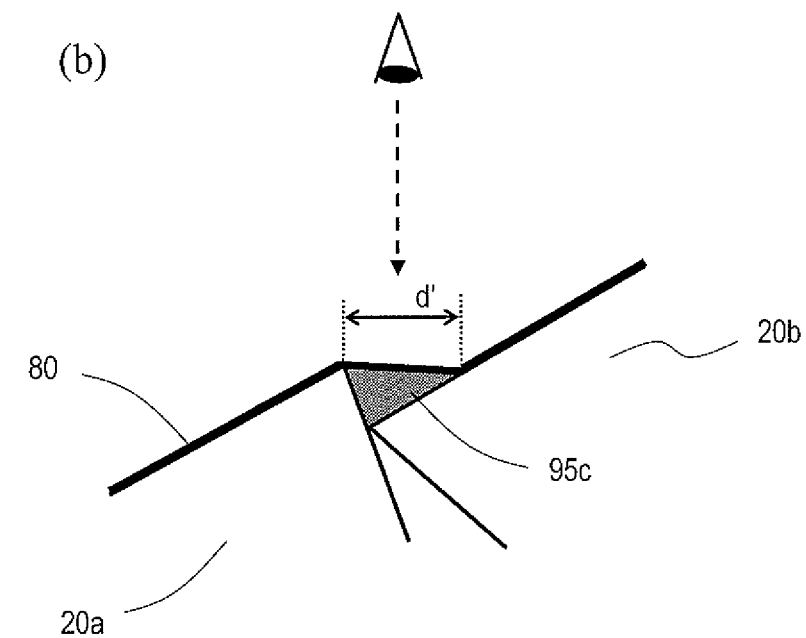

FIG.12
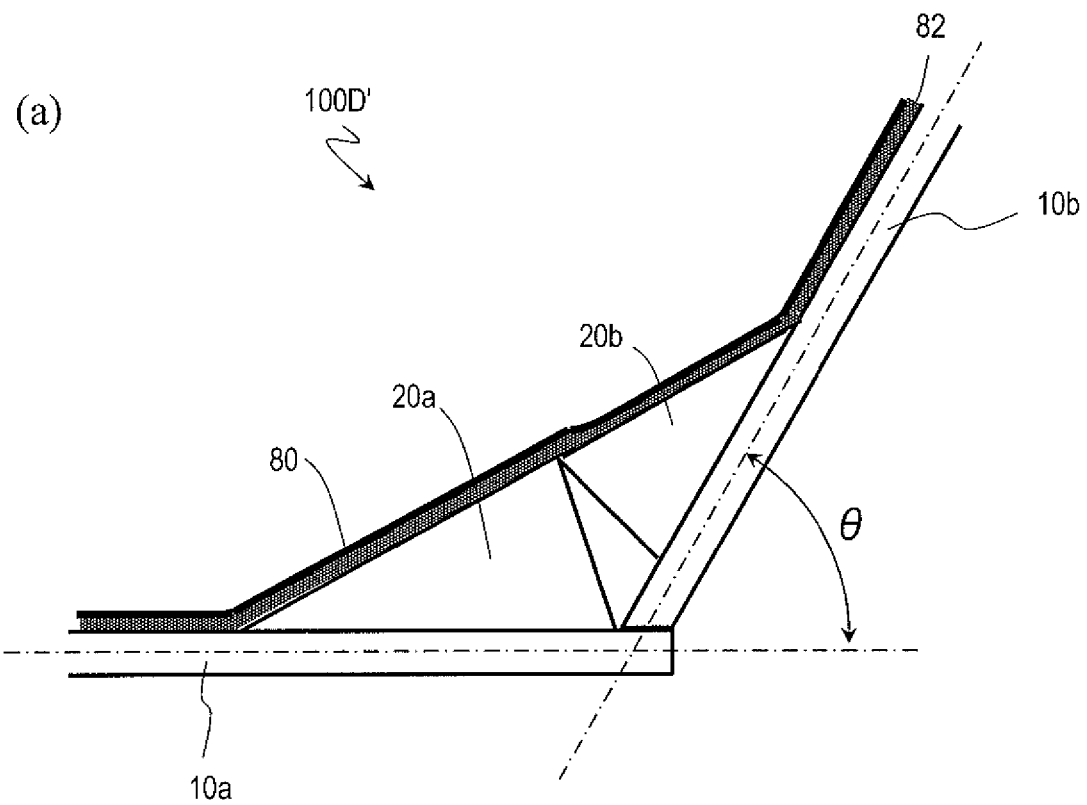
(a)
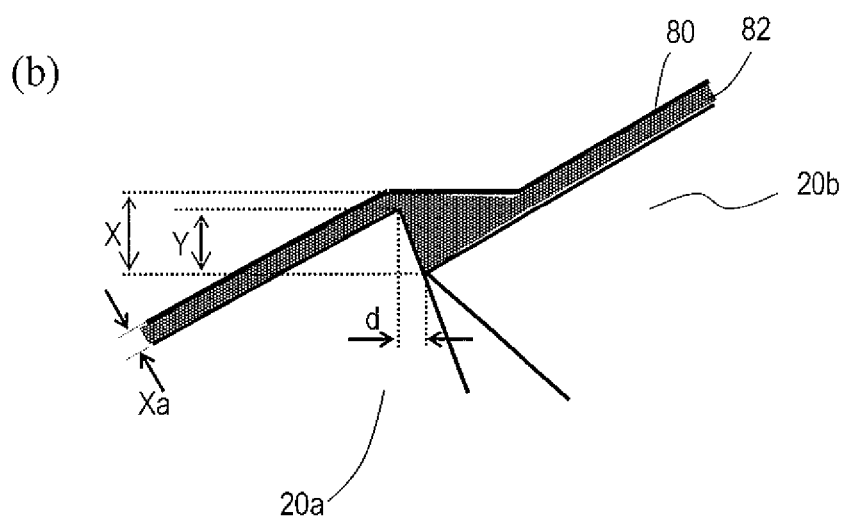
(b)

FIG.13
(a)
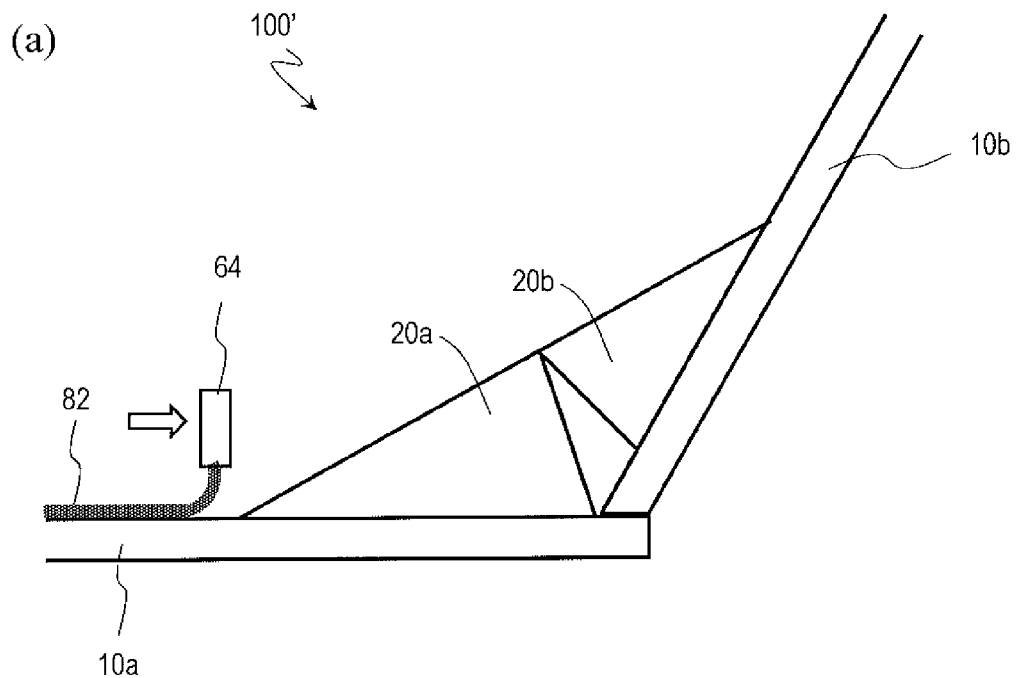
(b)
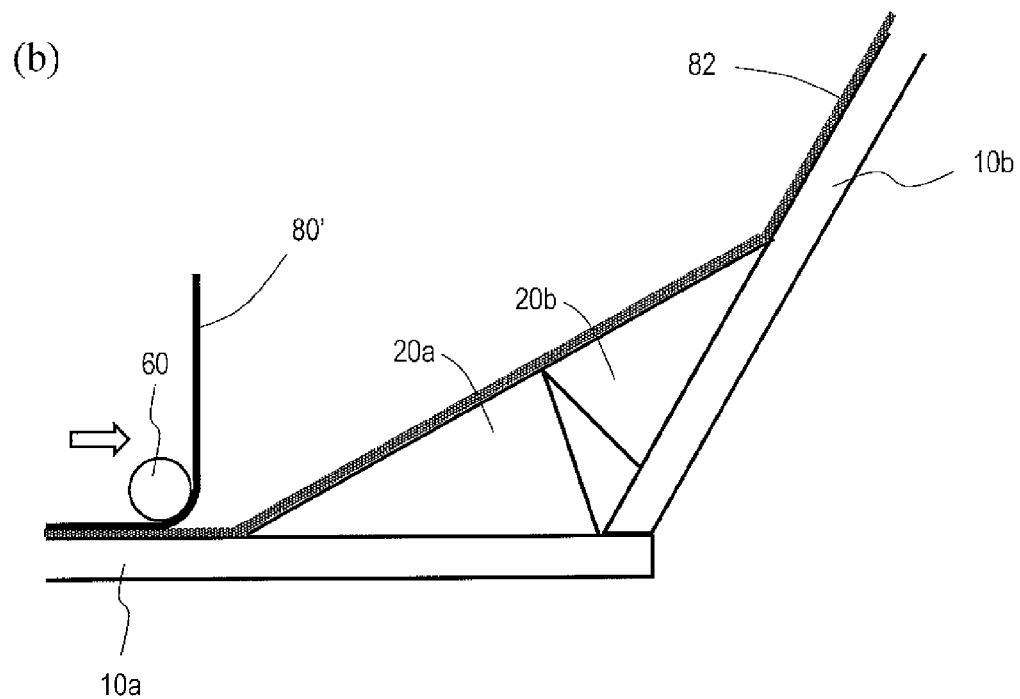

FIG.14
(a)
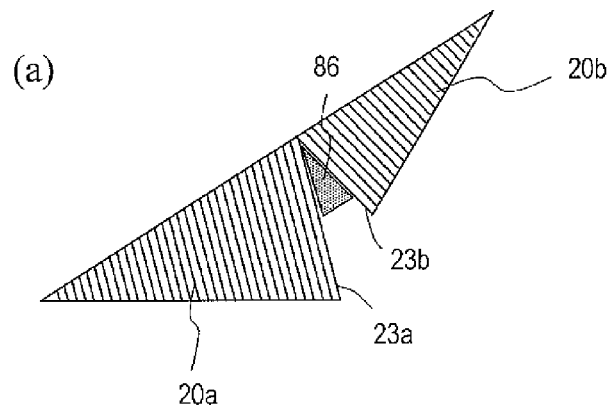
(b)
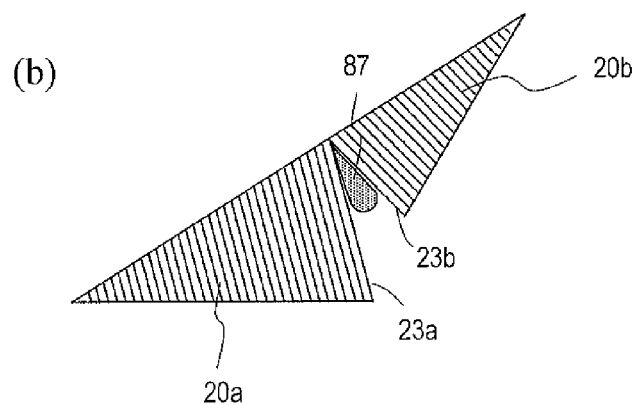
FIG.15
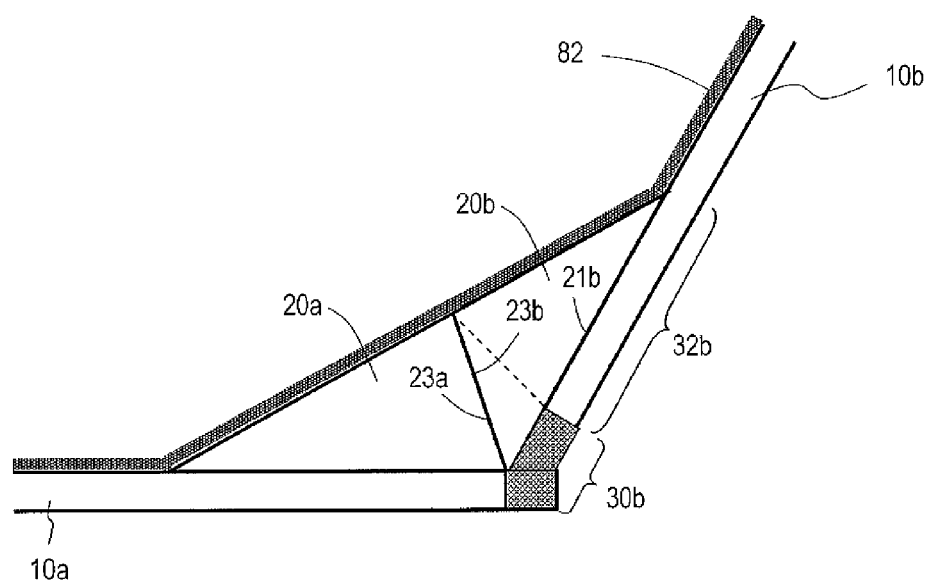

DISPLAY DEVICE WITH LIGHT GUIDE ELEMENT OVERLAPPING PERIPHERIAL DISPLAY REGION OF DISPLAY PANEL

TECHNICAL FIELD

The present invention relates to a display device and a production method for a display device, and in particular to a direct-viewing type display device and a production method for a direct-viewing type display device.

BACKGROUND ART

In recent years, there is a strong desire for an increase in the size of television sets and display devices for displaying information. Representative examples of large-sized display devices are display devices in which self-light-emitting elements such as light-emitting diodes (LEDs) are arranged in a matrix array and projection-type display devices; however, these have disadvantages in terms of image quality. Therefore, a further increase in the size of direct-viewing type liquid crystal display devices (LCDs) and plasma display devices (PDPs), which are capable of displaying with a high image quality, is being desired.

Since a direct-viewing type liquid crystal display device or a plasma display device is basically formed on a glass substrate, its screen size depends on the substrate size. Currently, the largest of glass substrates (mother substrates) that are used for the production of liquid crystal display devices are those of the eighth generation (2200 mm×2400 mm), and liquid crystal display devices whose diagonal is about 100 inches are being produced by using these substrates. The substrates that are available for mass production will become more increased in size, however at a slow rate. It is difficult to immediately provide display devices with the larger areas that are required on the current market.

Therefore, as a method of realizing a large-screen display device, there has been a conventional attempt of realizing a make-believe large-screen display device by arraying a plurality of display devices (which may be referred to as tiling). However, the tiling technique induces a problem of visible joints between the plurality of display devices. This problem will be described by taking a liquid crystal display device for example.

Note that a liquid crystal display device mainly includes a liquid crystal display panel, a backlight device, circuits for supplying various electrical signals to the liquid crystal display device, and a power supply, as well as a housing in which to accommodate these. The liquid crystal display panel mainly includes a pair of glass substrates and a liquid crystal layer provided therebetween. On one of the pair of glass substrates, pixel electrodes are formed in a matrix shape, and TFTs, bus lines, a driving circuit for supplying signals to them, and the like are formed, for example. On the other glass substrate, a color filter layer and a counter electrode are provided. The liquid crystal display panel has a display region in which a plurality of pixels are arrayed, and a frame region surrounding it. In the frame region, a sealing portion for allowing the pair of substrates to oppose each other and also sealing and retaining the liquid crystal layer, an implementation of driving circuitry for driving the pixels, and the like are provided.

Thus, since the frame region not contributing to any displaying exists in a liquid crystal display panel, when a large screen is constructed by arraying a plurality of liquid crystal display panels, the image will have joints. This problem is not limited to liquid crystal display devices, but is shared among direct-viewing type display devices, e.g., PDPs, organic EL display devices, and electrophoresis display devices.

Patent Document 1 discloses a construction which includes an optical fiber face plate covering the entire display panel, and the light going out from a display region is guided to a non-display region by the optical fiber face plate, such that jointless displaying is performed.

Patent Document 2 discloses a construction in which an optical fiber face plate complex is provided on the entire display panel, and the light going out from a display region is guided to a non-display region by the optical fiber face plate, such that jointless displaying is performed.

Patent Document 3 discloses a construction including an optical compensation means over substantially the entire display panel, the optical compensation means being composed of a multitude of slanted thin films and a transparent material filled between the slanted thin films, such that jointless displaying is performed by allowing light which is emitted from a display region to be guided to a non-display region by the optical compensation means.

CITATION LIST

Patent Literature

[Patent Document 1] Japanese Laid-Open Patent Publication No. 7-128652
[Patent Document 2] Japanese Laid-Open Patent Publication No. 2000-56713
[Patent Document 3] Japanese Laid-Open Patent Publication No. 2001-5414

SUMMARY OF INVENTION

Technical Problem

Since an optical fiber face plate is an aggregate of optical fibers, it becomes increasingly difficult and costing to produce as it increases in area. The conventional techniques described in Patent Document 1 and Patent Document 2 require an optical fiber face plate covering substantially the entire display panel, and thus are not practical from the standpoint of the production method and cost particularly in large-sized display devices.

The technique described in Patent Document 3 differs from the techniques of Patent Documents 1 and 2 in that an optical compensation means composed of a multitude of slanted thin films and a transparent material filled between the slanted thin films is used, instead of an optical fiber face plate. However, it still requires the optical compensation means covering substantially the entire display panel, thus presenting problems similar to those of the techniques described in Patent Document 1 and Patent Document 2.

Note that Patent Document 2 states that a parallel plate (a fiber face plate whose incident face and outgoing face are parallel) to be disposed in the display region is omissible. However, when the parallel plate is omitted, an end face portion of a block-like (having a rectangular cross section) optical fiber face plate that is disposed at an edge portion of the display region forms a level difference within the display region, thus rendering the image discontinuous and detracting from display quality.

The present invention has been made in order to solve the above problems, and an objective thereof is to provide a direct-viewing type display device in which frame regions of display panels, or a joint in the case of tiling, are obscured, the direct-viewing type display device being easier to produce or incurring lower cost than conventionally. It is a particular objective to reduce the cost of a display device in which a plurality of display panels are provided at a predetermined angle.

Solution to Problem

A direct-viewing type display device according to the present invention comprises a plurality of display panels, having a display region and a frame region outside the display region, wherein, the plurality of display panels include first and second display panels adjoining each other; the frame region of the first display panel is overlapped by a side face of the second display panel, such that a viewer-side surface of the first display panel and a viewer-side surface of the second display panel constitute an angle of more than 0° but less than 180°; first and second light guide elements are disposed on a viewer's side of peripheral display regions adjoining the frame regions of the first and second display panels, respectively; the first and second light guide elements have an incident face, an outgoing face, and a plurality of light guiding portions formed between the incident face and the outgoing face; a distance between the incident face and the outgoing face of the first and second light guide elements increases away from the peripheral display region and toward the frame region; a volume of the first light guide element is larger than a volume of the second light guide element; and the outgoing face of the first light guide element and the outgoing face of the second light guide element are covered by a functional film.

In one embodiment, the direct-viewing type display device according to the present invention further comprises an adhesion layer having a thickness of no less than 0.2 mm and no more than 1.0 mm provided between: the functional film; and the outgoing face of the first light guide element and the outgoing face of the second light guide element.

In one embodiment, the first light guide element has a side face abutting an end of the outgoing face closer to the second display panel and an end of the incident face closer to the second display panel; the second light guide element has a side face abutting an end of the outgoing face closer to the first display panel and an end of the incident face closer to the first display panel; and the display device further comprises a gap-sealing member provided at a corner portion at which the side face of the first light guide element meets the side face of the second light guide element.

In one embodiment, the first light guide element has a side face abutting an end of the outgoing face closer to the second display panel and an end of the incident face closer to the second display panel; the second light guide element has a side face abutting an end of the outgoing face closer to the first display panel and an end of the incident face closer to the first display panel; and the side face of the first light guide element abuts the side face of the second light guide element.

In one embodiment, the direct-viewing type display device according to the present invention further comprises a light-transmitting front face plate, wherein, the front face plate is provided via an adhesion layer so as to cover the outgoing face of the first light guide element and the outgoing face of the second light guide element; and the functional film is provided on the front face plate.

In one embodiment, the front face plate is disposed so as to cover the outgoing face of the first light guide element, the outgoing face of the second light guide element, a portion of the viewer-side surface of the first display panel, and a portion of the viewer-side surface of the second display panel; and within a viewer-side surface of the front face plate, at least one of the following is a curved surface: a corner portion at which a portion disposed on the viewer's side of the first light guide element meets a portion disposed on the viewer's side of the first display panel; and a corner portion at which a portion disposed on the viewer's side of the second light guide element meets a portion disposed on the viewer's side of the second display panel.

A production method for a display device according to the present invention comprises: (a) a step or providing a display panel unit having a first display panel, a second display panel, a first light guide element disposed on a viewer-side surface of the first display panel, and a second light guide element disposed on a viewer-side surface of the second display panel, such that an angle defined by the viewer-side surface of the first display panel and the viewer-side surface of the second display panel is more than 0° but less than 180°; and (b) a step of, with pressure being applied, attaching a functional film onto an outgoing face of the first light guide element and an outgoing face of the second light guide element via an adhesion layer.

In one embodiment, the adhesion layer is formed by using an adhesive having a viscosity of no less than 50 Pa·s and no more than 5000 Pa·s so that the adhesion layer has a thickness of no less than 0.2 mm and no more than 1.0 mm.

A production method for a display device according to the present invention comprises: (a) a step or providing a display panel unit having a first display panel, a second display panel, a first light guide element disposed on a viewer-side surface of the first display panel, and a second light guide element disposed on a viewer-side surface of the second display panel, such that an angle defined by the viewer-side surface of the first display panel and the viewer-side surface of the second display panel is more than 0° but less than 180°; (b) a step of providing a light-transmitting front face plate on an outgoing face of the first light guide element and an outgoing face of the second light guide element via an adhesion layer; and (c) a step of providing a functional film on the front face plate.

In one embodiment, a light shielding layer is provided on at least one of the side face of the first light guide element and the side face of the second light guide element.

In one embodiment, the light shielding layer is formed by providing a light shielding film.

In one embodiment, the light shielding layer contains an organic polymer material and a light shielding material.

In one embodiment, the organic polymer material contains a polyester resin.

In one embodiment, the light shielding material contains carbon black.

In one embodiment, a plurality of optical fibers are arranged in parallel on the first and second light guide elements.

In one embodiment, a plurality of light guide layers are arranged in parallel on the first and second light guide elements.

In one embodiment, the functional film is an antireflection film.

In one embodiment, the functional film is a hardcoat film.

In one embodiment, the functional film is an antisoiling film.

In one embodiment, the functional film is a touch panel film.

In one embodiment, the plurality of display panels include three display panels.

In one embodiment, the attaching step (b) is performed in an ambient of reduced pressure.

In one embodiment, in the attaching step (b), the functional film is pressurized by a roll-shaped pressurizing member.

In one embodiment, the adhesion layer is provided on the functional film.

In one embodiment, the adhesion layer is provided by applying an adhesive.

In one embodiment, the adhesive is a liquid adhesive or a gel tackiness agent.

In one embodiment, an adhesive is applied between the side face of the first light guide element and the side face of the second light guide element.

In one embodiment, the antireflection film is an LR film.

In one embodiment, the antireflection film has a moth-eye structure.

In one embodiment, the antireflection film is a dielectric multilayer film.

In one embodiment, a buffer layer is further comprised, wherein the buffer layer is disposed between the incident face of the first light guide element and a display plane of the first display panel, and between the incident face of the second light guide element and a display plane of the second display panel; and a refractive index of the buffer layer is similar to a refractive index of the first and second light guide elements and to a refractive index of a member on the viewer's side of the first and second display panels.

In one embodiment, the buffer layer is made of a UV-curing resin.

In one embodiment, an end of the outgoing face of the first light guide element closer to the second display panel abuts an end of the outgoing face of the second light guide element closer to the first display panel.

In one embodiment, the outgoing face of the first light guide element is parallel to the outgoing face of the second light guide element.

In one embodiment, shapes of the first and second light guide elements are triangular prisms.

In one embodiment, shapes of the first and second light guide elements are isosceles triangular prisms.

In one embodiment, the angle defined by the viewer-side surface of the first display panel and the viewer-side surface of the second display panel is θ; and shapes of the first and second light guide elements are isosceles triangular prisms with vertex angles of θ/2.

In one embodiment, shapes of the outgoing faces of the first and second light guide elements are cylindrical surfaces.

In one embodiment, the display device according to the present invention further comprises a backlight device on an opposite side of the second display panel from the viewer-side surface, wherein a side face of the backlight device closer to the first display panel is parallel to the viewer-side surface of the first display panel and overlaps the frame region of the first display panel.

In one embodiment, a light-diffusing layer is provided on the outgoing face of the first light guide element or the outgoing face of the second light guide element.

In one embodiment, the plurality of display panels include at least three display panels; and the at least three display panels are disposed in an annular shape.

In one embodiment, the plurality of light guiding portions include at least one transparent portion, a metal portion being provided in at least a portion of a side face of the at least one transparent portion.

In one embodiment, the first and second light guide elements comprise a laminate in which a plurality of transparent layers and a plurality of metal layers are stacked.

In one embodiment, the plurality of metal layers include a metal layer having a thickness of no less than 100 nm and no more than 5 μm.

In one embodiment, the plurality of metal layers include a metal layer having a thickness of no less than 100 nm and no more than 1 μm.

In one embodiment, the at least one transparent portion is substantially cylindrical, and the side face of the at least one transparent portion is covered by the metal portion.

Advantageous Effects of Invention

According to the present invention, there is provided a direct-viewing type display device in which frame regions of display panels, or a joint in the case of tiling, are obscured, the direct-viewing type display device being easier to produce than conventionally or incurring lower cost than conventionally. In particular, a display device in which a plurality of display panels are provided at a predetermined angle can be provided at low cost.

BRIEF DESCRIPTION OF DRAWINGS

[FIGS. 4] (a) and (b) are schematic cross-sectional views for describing a production method for the liquid crystal display device 100.

[FIGS. 8] (a) to (c) are schematic diagrams for explaining poor displaying by the liquid crystal display device 100B.

[FIGS. 9] (a) and (b) are schematic diagrams for explaining poor displaying by the liquid crystal display device 100B.

[FIG. 12] (a) is a schematic cross-sectional view of a liquid crystal display device 100D', and (b) is an enlarged cross-sectional view of a portion of the liquid crystal display device 100D' at which light guide elements 20a and 20b abut each other.

[FIGS. 13] (a) and (b) are schematic cross-sectional views for describing another production method for the liquid crystal display device 100D.

[FIGS. 14] (a) and (b) are schematic cross-sectional views for describing a construction for sealing the gap between light guide elements 20a and 20b.

[FIG. 15] A schematic cross-sectional view for describing another construction for sealing the gap between the light guide elements 20a and 20b.

DESCRIPTION OF EMBODIMENTS

Hereinafter, embodiments of the display device according to the present invention will be described with reference to the drawings.

Figure 1:
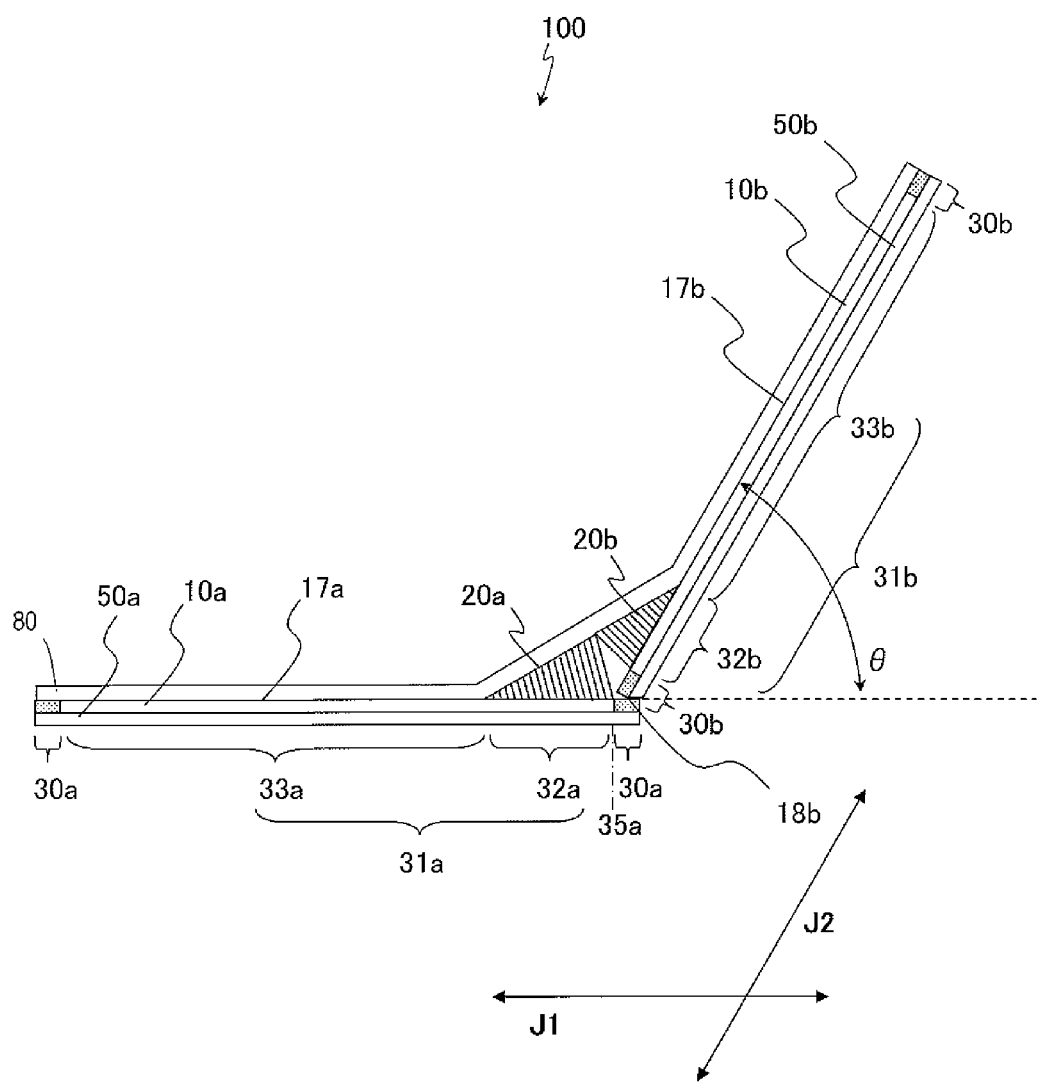
[FIG. 1] A schematic cross-sectional view of a liquid crystal display device 100 according to an embodiment of the present invention.
Figure 2:
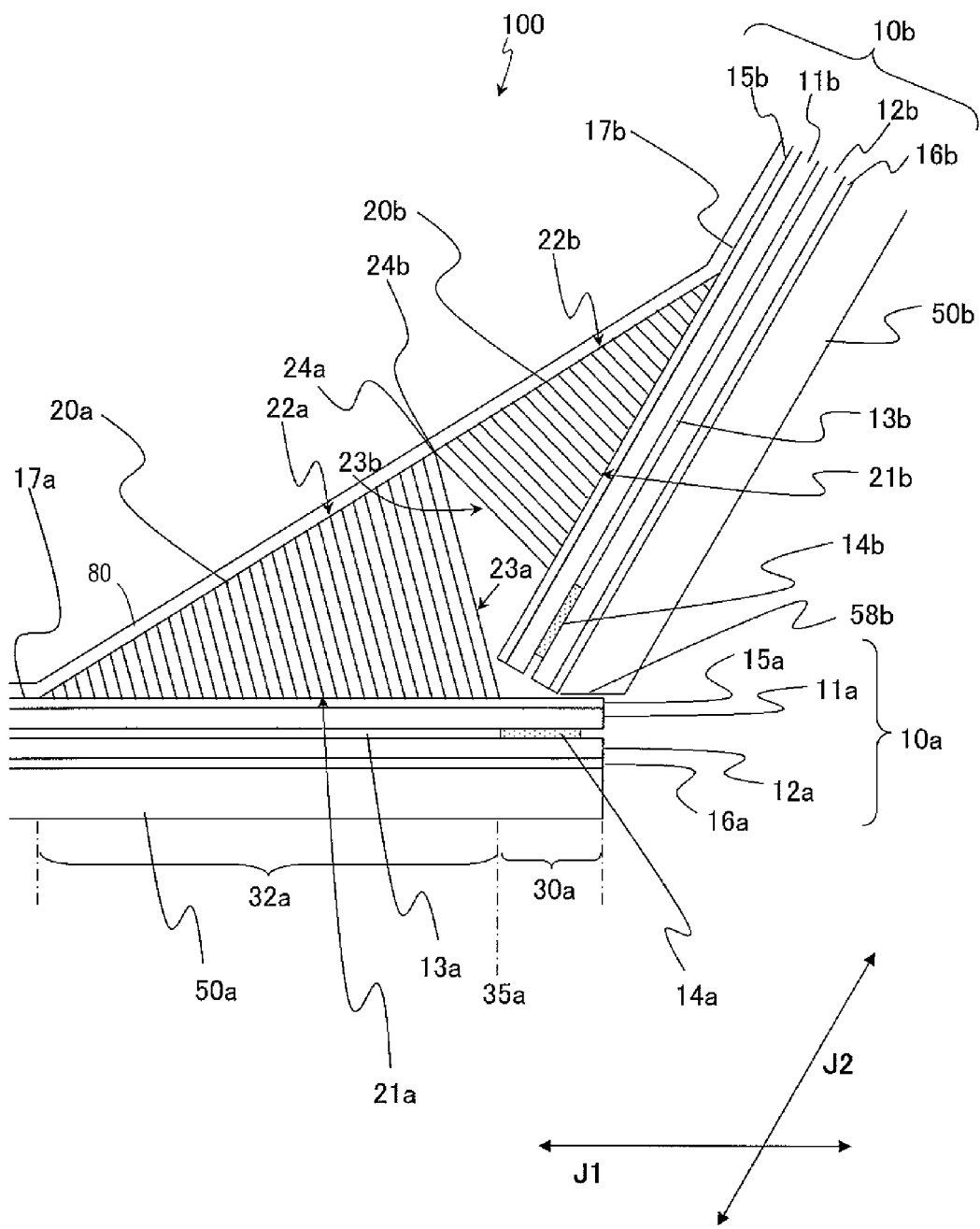
[FIG. 2] A schematic enlarged cross-sectional view of a joint between liquid crystal display panels 10a and 10b in the liquid crystal display device 100.
Figure 3:
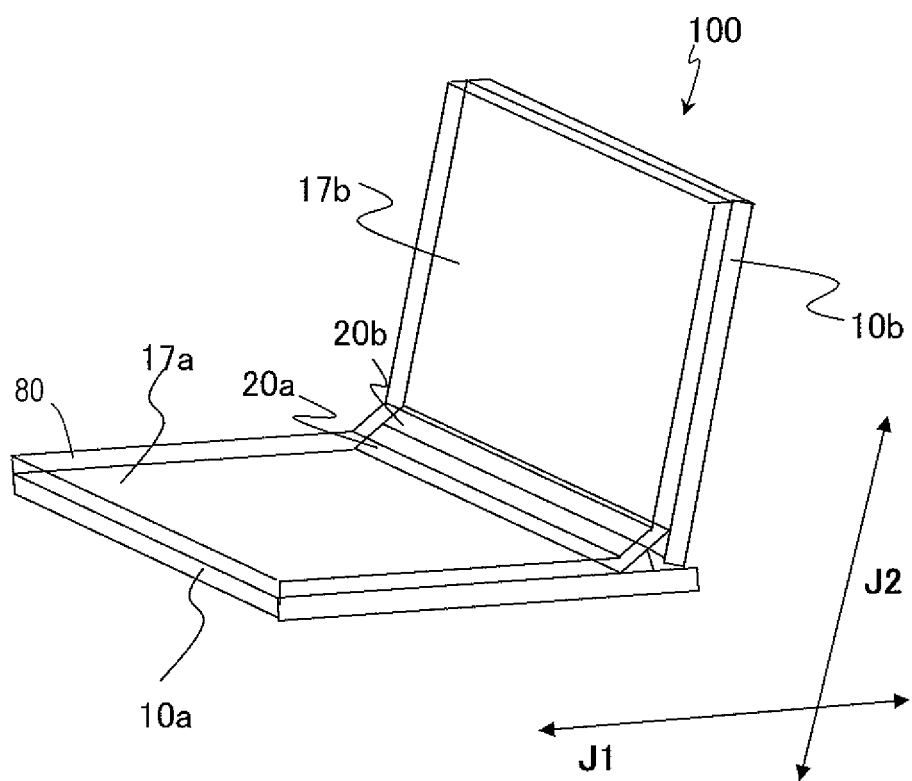
[FIG. 3] A schematic perspective view of the liquid crystal display device 100 according to an embodiment of the present invention.

With reference to FIG. 1 to FIG. 3, the construction and operation of a display device according to an embodiment of the present invention will be described. Although a liquid crystal display device in which a liquid crystal display panel is used as the display panel will be illustrated below, the display panel to be used for a display device according to the present invention is not limited thereto. As the display panel, for example, a display panel for PDP, an organic EL display panel, an electrophoresis display panel, or the like can be used.

FIG. 1 is a schematic cross-sectional view of a liquid crystal display device 100 according to an embodiment of the present invention. The liquid crystal display device 100 shown in FIG. 1 includes two adjoining liquid crystal display panels 10a and 10b, and two light guide elements 20a and 20b. The liquid crystal display device 100 is a display device which is tiled with two liquid crystal display panels 10a and 10b disposed at a predetermined angle (i.e., 6, described later). Tiling can be achieved by known methods. FIG. 2 is an enlarged view of a joint between the liquid crystal display panel 10a and the liquid crystal display panel 10b of the liquid crystal display device 100. The joint of the liquid crystal display device 100 will be described later in detail. FIG. 3 is a schematic perspective view of the liquid crystal display device 100 according to an embodiment of the present invention. FIG. 1 is a cross-sectional view of the liquid crystal display device 100 of FIG. 3 taken along a plane which is perpendicular to viewer-side surfaces 17a and 17b of the liquid crystal display panels 10a and 10b.

As shown in FIG. 1 and FIG. 2, a light guide element 20a is provided on the viewer-side surface 17a of the liquid crystal display panel 10a. The liquid crystal display device 100 is a transmission type, and includes a backlight device 50a provided on the opposite side (lower side in FIG. 1 and FIG. 2) of the liquid crystal display panel 10a from the viewer's side. The liquid crystal display device 100 performs displaying by modulating light which is emitted from the backlight device 50a through the liquid crystal display panel 10a. Similarly to the liquid crystal display panel 10a, a light guide element 20b is provided on the viewer-side surface 17b of the liquid crystal display panel 10b, and a backlight device 50b is provided on the opposite side from the viewer's side.

Although the liquid crystal display device 100 includes two liquid crystal display panels 10a and 10b, it may include more display panels. Examples of display devices having three or more display panels will be described later.

The liquid crystal display panel 10a may be any known liquid crystal display panel, and is a TFT liquid crystal display panel of the VA mode. As shown in FIG. 2, the liquid crystal display panel 10a includes a TFT substrate 12a and a counter substrate 11a, with a liquid crystal layer 13a being provided between the TFT substrate 12a and the counter substrate 11a. TFTs and pixel electrodes are provided on the TFT substrate 12a, whereas color filters and a counter electrode are provided on the counter substrate 11a. The liquid crystal layer 13a is retained between the counter substrate 11a and the TFT substrate 12a by means of a sealing portion 14a. On the viewer's side of the counter substrate 11a (upper side in FIG. 2) and the opposite side (lower side in FIG. 2) of the TFT substrate 12a from the viewer's side, optical film portions 15a and 16a are provided, respectively. The optical film portions 15a and 16a include polarizers and optionally phase plates. Similarly to the liquid crystal display panel 10a, the liquid crystal display panel 10b includes a counter substrate 11b, a TFT substrate 12b, a liquid crystal layer 13b, a sealing portion 14b, optical film portions 15b and 16b, and the like.

The liquid crystal display panels 10a and 10b have display regions 31a and 31b, in which a plurality of pixels are arrayed, and frame regions 30a and 30b lying outside the display regions 31a and 31b. The frame regions 30a and 30b include regions where the sealing portions 14a and 14b, terminals of various wiring lines, driving circuitry, and the like are provided. Generally speaking, light shielding films are formed in the frame regions 30a and 30b. Therefore, the frame regions 30a and 30b do not contribute to displaying.

In the display region 31a of the liquid crystal display panel 10a, a plurality of pixels (not shown) are arranged in a matrix array having rows and columns. The row direction corresponds to the horizontal direction in the display plane of the liquid crystal display panel 10a (a direction which is perpendicular to the plane of the figure of FIG. 1), whereas the column direction corresponds to the vertical direction in the display plane (the right-left direction in the plane of the figure of FIG. 1). In the display region 31b of the liquid crystal display panel 10b, a plurality of pixels are arranged in a matrix array having rows and columns, similarly to the liquid crystal display panel 10a.

The backlight devices 50a and 50b are direct-type backlight devices having a plurality of fluorescent lamps which are parallel to one another, for example. Note that, as will be described later, those which allow for the adjustment of luminance distribution are preferable.

As shown in FIG. 1, the liquid crystal display panel 10a and the liquid crystal display panel 10b are placed so that the angle between the viewer-side surface 17a of the liquid crystal display panel 10a and the viewer-side surface 17b of the liquid crystal display panel 10b is a predetermined angle $\theta$ ($0°<\theta<180°$). As shown in FIG. 1, the angle $\theta$ represents an angle which is constituted by the viewer-side surface 17b of the liquid crystal display panel 10b and a plane which is an extension of the viewer-side surface 17a of the liquid crystal display panel 10a toward the liquid crystal display panel 10b.

Although the angle $\theta$ may be set to various angles depending on the product form, FIG. 1 illustrates a liquid crystal display device 100 whose $\theta=60°$.

The liquid crystal display panels 10a and 10b are disposed so that the frame region of one liquid crystal display panel overlaps a side face of the other liquid crystal display panel. In the liquid crystal display device 100, a side face 18b of the liquid crystal display panel 10b overlaps the frame region 30a of the liquid crystal display panel 10a.

As shown in FIG. 2, the light guide element 20a disposed on the viewer's side of the liquid crystal display panel 10a includes an incident face 21a, an outgoing face 22a, and a plurality of light guiding portions formed between the incident face 21a and the outgoing face 22a. The incident face 21a of the light guide element 20a overlaps an peripheral display region 32a, which is a region of the display region 31a of the liquid crystal display panel 10a that adjoins the frame region 30a along a first axis (J1). Moreover, the incident face 21a is disposed so as to be parallel to the viewer-side surface 17a of the liquid crystal display panel 10a. Herein, the first axis J1 is assumed to be an axis extending parallel to the column direction of the liquid crystal display panel 10a (i.e., a vertical direction in the display plane of the liquid crystal display panel 10a). The distance between the incident face 21a and the outgoing face 22a increases away from the peripheral display region 32a and toward the frame region 30a (from left to right in FIG. 2) along the first axis J1. In the liquid crystal display device 100, the incident face 21a extends to a boundary 35a between the peripheral display region 32a and the frame region 30a.

Similarly to the light guide element 20a, the light guide element 20b includes an incident face 21b, an outgoing face 22b, and a plurality of light guiding portions formed between the incident face 21b and the outgoing face 22b. The incident face 21b is disposed so as to overlap a peripheral display region 32b, which is a region of the display region 31b of the liquid crystal display panel 10b that adjoins the frame region 30b along a second axis J2 (the frame region 30b, the display region 31b, and the peripheral display region 32b are shown in FIG. 1). The distance between the incident face 21b and the outgoing face 22b increases away from the peripheral display region 32b and toward the frame region 30b along the second axis J2. Herein, the second axis J2 is assumed to be an axis extending parallel to the column direction of the liquid crystal display panel 10b (i.e., a vertical direction in the display plane of the liquid crystal display panel 10b).

In the liquid crystal display device 100, the light guide element 20a has a triangular cross-sectional shape. The overall shape of the light guide element 20a is a triangular prism whose cross section that is perpendicular to the longitudinal direction is a triangle. This triangular prism is defined by the incident face 21a, the outgoing face 22a, and the side face 23a. Similarly, the overall shape of the light guide element 20b is a triangular prism whose cross section that is perpendicular to the longitudinal direction is a triangle, this triangular prism being defined by the incident face 21b, the outgoing face 22b, and the side face 23b. In the liquid crystal display device 100, the light guide elements 20a and 20b are disposed so that their longitudinal directions are parallel to the horizontal directions in the display planes of the liquid crystal display panels 10a and 10b.

Since the shape of the light guide element 20a is a triangular prism, the outgoing face 22a lies closer to the viewer's side than is the viewer-side surface 17a of the liquid crystal display panel 10a. Similarly, since the shape of the light guide element 20b is a triangular prism, the outgoing face 22b lies closer to the viewer's side than is the viewer-side surface 17b of the liquid crystal display panel 10b. Therefore, on the viewer's side of the peripheral display region 32a, the frame region 30a, the frame region 30b, and the peripheral display region 32b, the outgoing faces 22a and 22b exist.

The light guide element 20a and the light guide element 20b are optical fiber face plates composed of a group of optical fibers, for example. As is well known, each optical fiber includes a core and a cladding, such that light propagates within the core. That is, the core of each optical fiber functions as one light guide path. The group of optical fibers which the optical fiber face plate includes are formed so that the length directions of the optical fibers are aligned in parallel. In the light guide elements 20a and 20b of the present embodiment, a plurality of optical fibers are arranged in a direction which is perpendicular to the longitudinal direction of the light guide elements 20a and 20b. As shown in FIG. 2, in the light guide element 20a of the liquid crystal display device 100 of the present embodiment, optical fibers are arrayed in parallel to the side face 23a of the light guide element 20a. Similarly, in the light guide element 20b, optical fibers are arrayed in parallel to the side face 23b of the light guide element 20b.

Light which enters the light guide element 20a through the incident face 21a propagates within the optical fibers in parallel to the side face 23a, and goes out at the outgoing face 22a toward the viewer's side. As described above, the incident face 21a overlaps the peripheral display region 32a of the liquid crystal display panel 10a. Therefore, light going out of the pixels within the peripheral display region 32a enters the light guide element 20a at the incident face 21a, propagates through the respective light guide paths which are parallel to the side face 23a, and goes out from the outgoing face 22a. Therefore, an image which is formed in the peripheral display region 32a is displayed on the viewer's side of the light guide element 20a. In the liquid crystal display device 100, the light guide element 20b is an optical fiber face plate similar to the light guide element 20a, such that light going out of the pixels within the peripheral display region 32b enters the light guide element 20b from the incident face 21b, propagates through the respective light guide paths which are parallel to the side face 23b, and goes out from the outgoing face 22b. Therefore, an image which is formed in the peripheral display region 32b of the liquid crystal display panel 10b is displayed on the viewer's side of the light guide element 20b.

Since the outgoing faces 22a and 22b are present on the viewer's side of the peripheral display region 32a, the frame region 30a, the frame region 30b, and the peripheral display region 32b, images which are formed in the peripheral display regions 32a and 32b are displayed on the viewer's side of the light guide elements 20a and 20b. Thus, the frame regions 30a and 30b are obscured. As a result, in the liquid crystal display device 100, the joint between the liquid crystal display panel 10a and the liquid crystal display panel 10b is obscured.

As shown in FIG. 2, in the liquid crystal display device 100, an end 24a of the outgoing face 22a of the light guide element 20a closer to the liquid crystal display panel 10b (corresponding to a line of intersection between the outgoing face 22a and the side face 23a) abuts an end 24b of the outgoing face 22b of the light guide element 20b closer to the liquid crystal display panel 10a (corresponding to a line of intersection between the outgoing face 22b and the side face 23b). Therefore, in the liquid crystal display device 100, the outgoing face 22a and the outgoing face 22b are visually recognized as continuous. This realizes displaying with further obscured joints. Furthermore, in the liquid crystal display device 100 of the present embodiment, the outgoing face 22a of the light guide element 20a and the outgoing face 22b of the light guide element 20b are parallel. Therefore, the outgoing face 22a and the outgoing face 22b are coplanar, such that a viewer will visually recognize the outgoing faces 22a and 22b as constituting one plane. This realizes displaying with further obscured joints. In other words, the liquid crystal display device 100 is able to display a continuous image with no joints, because of the outgoing face 22a of the light guide element 20a and the outgoing face 22b of the light guide element 20b being coplanar. Exemplary design values for the light guide element will be described later.

The optical fiber face plates to be used as the light guide element 20a and the light guide element 20b can be produced by, from an optical fiber face plate which has been formed in a plate shape, cutting out its incident face and outgoing face so as to define a triangular prism shape. For example, an optical fiber face plate made of quartz (e.g., whose core has a refractive index of 1.8 and whose cladding has a refractive index of 1.5) can be suitably used as an optical fiber face plate. The greater the refractive index difference between the core and the cladding increases, the numerical aperture (NA: Numerical Aperture) of the optical fibers is, the more preferable it is because the light transmittance is increased; however, there is no particular limitation as to the refractive indices of the core and the cladding. Moreover, there is no particular limitation as to the material of the optical fibers, and a transparent resin material such as an acrylic resin may be used.

The liquid crystal display device 100 further includes a functional film. The liquid crystal display device 100 includes an antireflection film 80 as the functional film. As shown in FIG. 1 and FIG. 2, the outgoing face 22a of the light guide element 20a, the outgoing face 22b of the light guide element 20b, the viewer-side surface 17a of the liquid crystal display panel 10a, and the viewer-side surface 17b of the liquid crystal display panel 10b are covered by the antireflection film 80.

The liquid crystal display panels 10a and 10b include the optical film portions 15a and 15b, the optical film portions 15a and 15b having polarizers. The polarizers have been subjected to an antireflection treatment. Therefore, reflection of external light at the liquid crystal display panels 10a and 10b is reduced. On the other hand, the outgoing faces 22a and 22b of the light guide elements 20a and 20b have not been subjected to any antireflection treatment. Therefore, there would be a larger intensity of reflected light of external light at the light guide elements 20a and 20b than at the liquid crystal display panels 10a and 10b.

For example, a polarizer having a TAC film (whose refractive index is about 1.5) has a reflectance of 4% or less. On the other hand, in the case where optical fiber face plates whose core refractive index is 1.8 and whose cladding refractive index is 1.5 are used as the light guide elements 20a and 20b, the reflectance at the outgoing faces 22a and 22b of the light guide elements 20a and 20b would exceed 5%. Therefore, display unevenness would occur due to a difference in reflectance between the liquid crystal display panels 10a and 10b and the light guide elements 20a and 20b.

As mentioned above, the liquid crystal display device 100 includes the antireflection film 80 covering the outgoing faces 22a and 22b of the light guide elements 20a and 20b, whereby reflection of external light at the outgoing faces 22a and 22b of the light guide elements 20a and 20b is reduced. Therefore, the difference in reflectance between the liquid crystal display panels 10a and 10b and the light guide elements 20a and 20b becomes smaller, thereby reducing display unevenness. As the antireflection film 80, an antireflection film having a moth-eye structure, which is able to suppress reflection of light entering from a broad range of angles, is preferable.

Next, with reference to FIGS. 4(a) and (b), a production method for the liquid crystal display device 100 will be described. FIGS. 4(a) and (b) are schematic cross-sectional views for describing a production method for the liquid crystal display device 100.

First, as shown in FIG. 4(a), a display panel unit 100' is provided, the display panel unit 100' having the liquid crystal display panel 10a, the liquid crystal display panel 10b, the light guide element 20a disposed on the viewer-side surface 17a of the liquid crystal display panel 10a, and the light guide element 20b disposed on the viewer-side surface 17b of the liquid crystal display panel 10b. The angle between the viewer-side surface 17a of the liquid crystal display panel 10a and the viewer-side surface 17b of the liquid crystal display panel 10b is the aforementioned θ (0°<θ<180°).

Next, as shown in FIG. 4(b), with pressure being applied, the antireflection film 80' is attached over the viewer-side surface 17a of the liquid crystal display panel 10a, the outgoing face 22a of the light guide element 20a, the outgoing face 22b of the light guide element 20b, and the viewer-side surface 17b of the liquid crystal display panel 10b via an adhesion layer, whereby the liquid crystal display device 100 is obtained. As shown in FIG. 4(b), the antireflection film 80' is attached while being pressurized by a roll-shaped pressurizing member 60. Note that the adhesion layer, which is omitted from illustration, is formed on the antireflection film 80' in advance, for example. The roll-shaped pressurizing member 60 undergoes a relative movement with respect to the display panel unit 100' in a direction indicated by an arrow.

In the production method described with reference to FIG. 4, the antireflection film 80' is attached onto the viewer-side surface 17a of the liquid crystal display panel 10a, the outgoing face 22a of the light guide element 20a, the outgoing face 22b of the light guide element 20b, or the viewer-side surface 17b of the liquid crystal display panel 10b (hereinafter, these may be collectively referred to as the "surface of the display panel unit 100'") via air. Therefore, it is possible that air voids may occur between the antireflection film 80' and the surface of the display panel unit 100'. With reference to FIGS.

Figure 5:
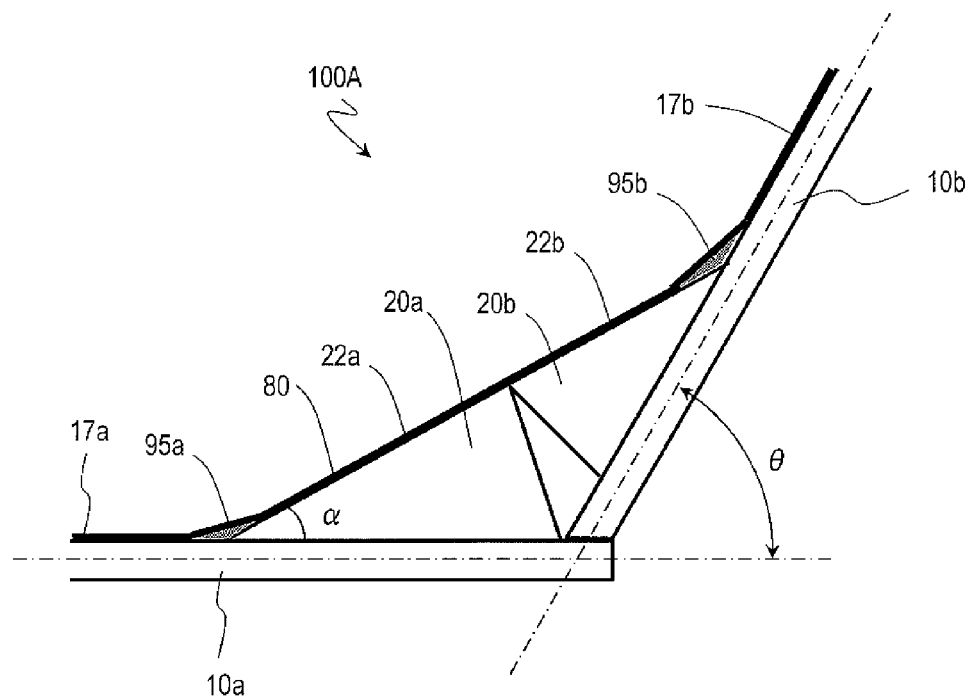
[FIG. 5] A schematic enlarged cross-sectional view of a joint between liquid crystal display panels 10a and 10b in a liquid crystal display device 100A.
Figure 6:
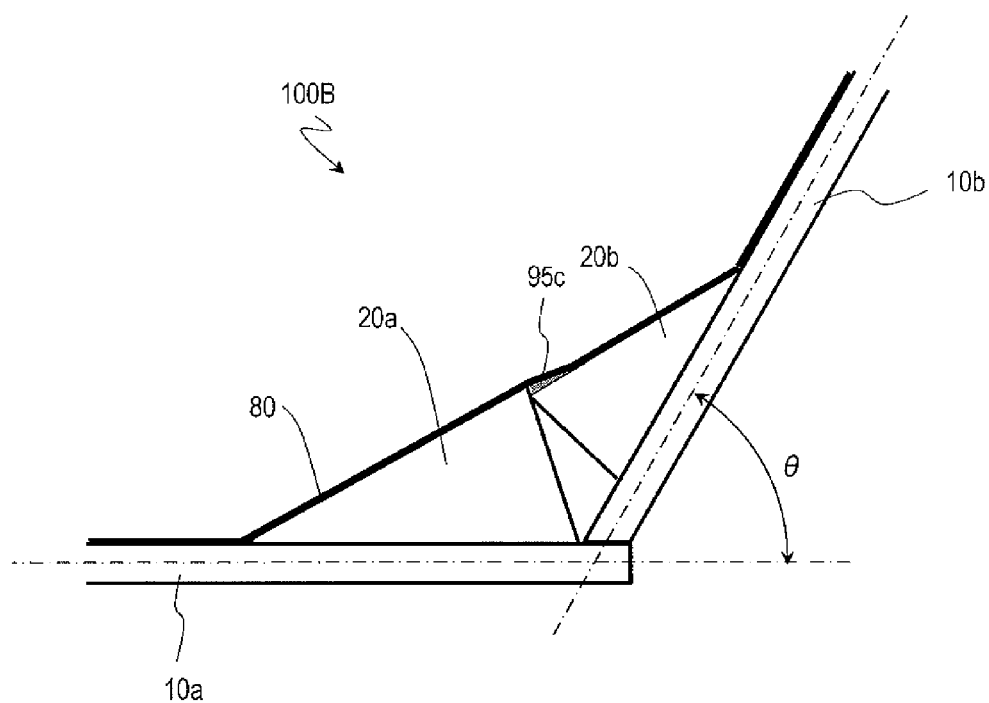
[FIG. 6] A schematic enlarged cross-sectional view of a joint between liquid crystal display panels 10a and 10b in a liquid crystal display device 100B.
Figure 7:
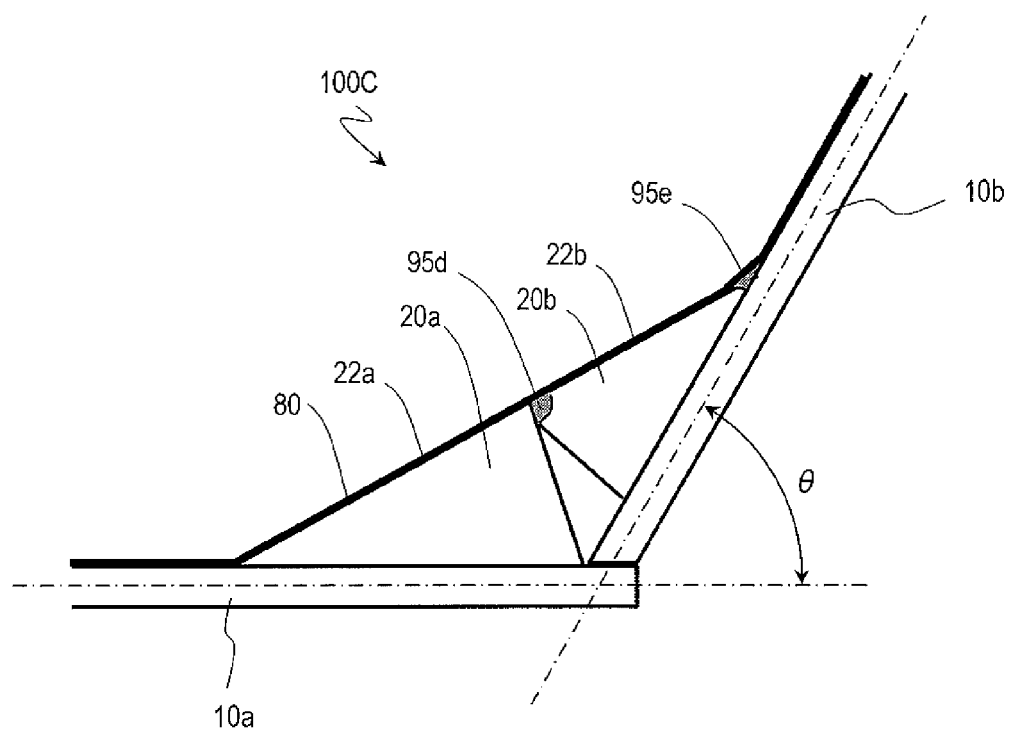
[FIG. 7] A schematic enlarged cross-sectional view of a joint between liquid crystal display panels 10a and 10b in a liquid crystal display device 100C.

5 to 7, the cause for air voids occurring upon attachment of the antireflection film 80' will be described. FIGS. 5, 6, and 7 respectively are schematic cross-sectional views of liquid crystal display devices 100A, 100B, and 100C in which air voids have occurred.

With reference to FIG. 5, the cause for air voids occurring in the liquid crystal display device 100A will be described. The viewer-side surface 17a of the liquid crystal display panel 10a and the outgoing face 22a of the light guide element 20a constitute a certain angle (shown as a). Since the outer peripheral surface of the roll-shaped pressurizing member 60 is a curved surface, during the attachment of the antireflection film 80', the antireflection film 80' cannot be attached so as to stick to the boundary between the viewer-side surface 17a of the liquid crystal display panel 10a and the outgoing face 22a of the light guide element 20a. Therefore, as shown in FIG. 5, an air void 95a may occur between the boundary between the viewer-side surface 17a and the outgoing face 22a and the antireflection film 80. Similarly at the boundary between the viewer-side surface 17b of the liquid crystal display panel 10b and the outgoing face 22b of the light guide element 20b, an air void 95b may occur between the boundary and the antireflection film 80.

Moreover, as in the liquid crystal display device 100B shown in FIG. 6, for example, when there is a level difference between the light guide element 20a and the light guide element 20b, the antireflection film 80' cannot be attached so as to follow along the level difference. Therefore, as shown in FIG. 6, an air void 95c may occur between the portion of level difference (i.e., the portion having a level difference between the side face 23a of the light guide element 20a and the outgoing face 22b of the light guide element 20b) and the antireflection film 80.

Moreover, as in the liquid crystal display device 100C shown in FIG. 7, for example, if the corner portion at which the outgoing face 22b of the light guide element 20b meets the side face 23b is chipped, an air void 95d may occur between the chipped portion and the antireflection film 80. On the other hand, if the corner portion at which the outgoing face 22b of the light guide element 20b meets the incident face 21b is rounded, an air void 95e may occur between the rounded portion and the antireflection film 80.

When air voids (95a to 95e) occur inside the antireflection film 80 as in the liquid crystal display devices 100A to 100C, the display quality may be deteriorated, as will be described below. Referring to FIG. 8, this problem will be described by taking the liquid crystal display device 100B (FIG. 6) as an example. FIGS. 8(a) to (c) show enlarged a portion of the liquid crystal display device 100B where the light guide element 20a meets the light guide element 20b.

As shown in FIG. 8(a), external light entering the portion where the air void 95c has occurred is partly reflected at the interface between the air and the antireflection film 80, or at the interface between the air void 95c and the outgoing face 22b of the light guide element 20b. Since the reflectance at the interface between the air and the antireflection film 80 and at the interface between the air void 95c and the outgoing face 22b is about 4%, the reflectance of light entering the portion where the air void 95c has occurred is about 8%. At any portion which is free of air voids and which has the antireflection film 80 provided thereon (e.g., upon the outgoing face 22a of the light guide element 20a), reflectance is reduced to 1.0% or less. Therefore, a difference in reflectance occurs between the portion where the air void 95c exists and the portions where no air voids exist, thus resulting in some display unevenness. Moreover, the portion where the air void 95c has occurred may exhibit white reflection due to its high reflectance.

Moreover, as shown in FIG. 8(b), a portion of the light entering the air void 95c from the light guide element 20b may be reflected by the side face 23a of the light guide element 20a and go out. This reflected light does not go out in the desired direction.

Moreover, as shown in FIG. 8(c), a portion of the light being emitted from the light guide element 20b and entering the air void 95c may be, after being reflected by the side face 23a of the light guide element 20a, repetitively reflected at the interface between the air void 95c and the antireflection film 80, the interface between the air void 95c and the outgoing face 22b, or the interface between the air void 95c and the side face 23a, and then go out. Such light does not go out from the desired positions.

In some cases, attaching the antireflection film 80 so as to cover the portion of level difference may render the level difference conspicuous. As shown in FIG. 9(a), when the antireflection film 80 is not attached, a level difference of a size d as shown in FIG. 9(a) will be visually recognized by the viewer. On the other hand, when the antireflection film 80 is attached and the air void 95c occurs at the level difference, the air void 95c will be visually recognize as an extraneous object of a size d'(>d). Thus, attaching the antireflection film 80 so as to cover the level difference may render the level difference conspicuous. For example, if the size d is smaller than the human resolving power and the size d' is greater than the human resolving power, attaching the antireflection film 80 may serve to allow the extraneous object to be visually recognized.

Now, a viewer with a visual acuity of 1.0 who is observing a target object about 60 cm therefrom has a resolving power of about 0.2 mm. For example, even if the aforementioned level difference size d is smaller than 0.2 mm, a viewer with a visual acuity of 1.0 who is observing the display device placed nearer than about 60 cm will feel that the level difference is conspicuous when the size d' of the air void occurring at the level difference is equal to or greater than 0.2 mm. Note that a visual acuity which is capable of recognizing a viewing angle of one minute of arc is defined as 1.0 herein.

Figure 10:
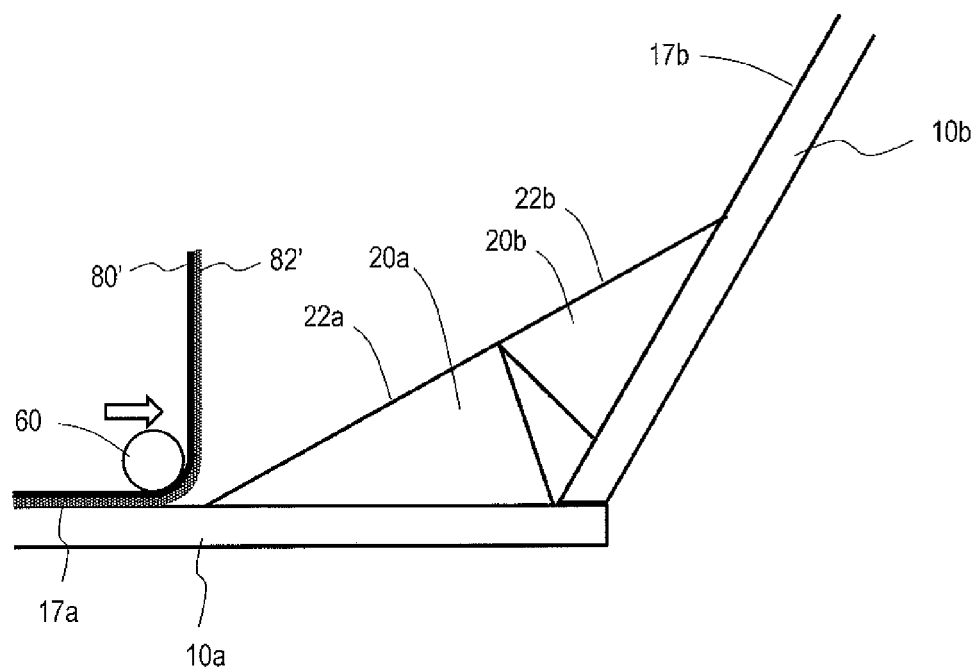
[FIG. 10] A schematic cross-sectional view for describing a production method for a liquid crystal display device 100D.
Figure 11:
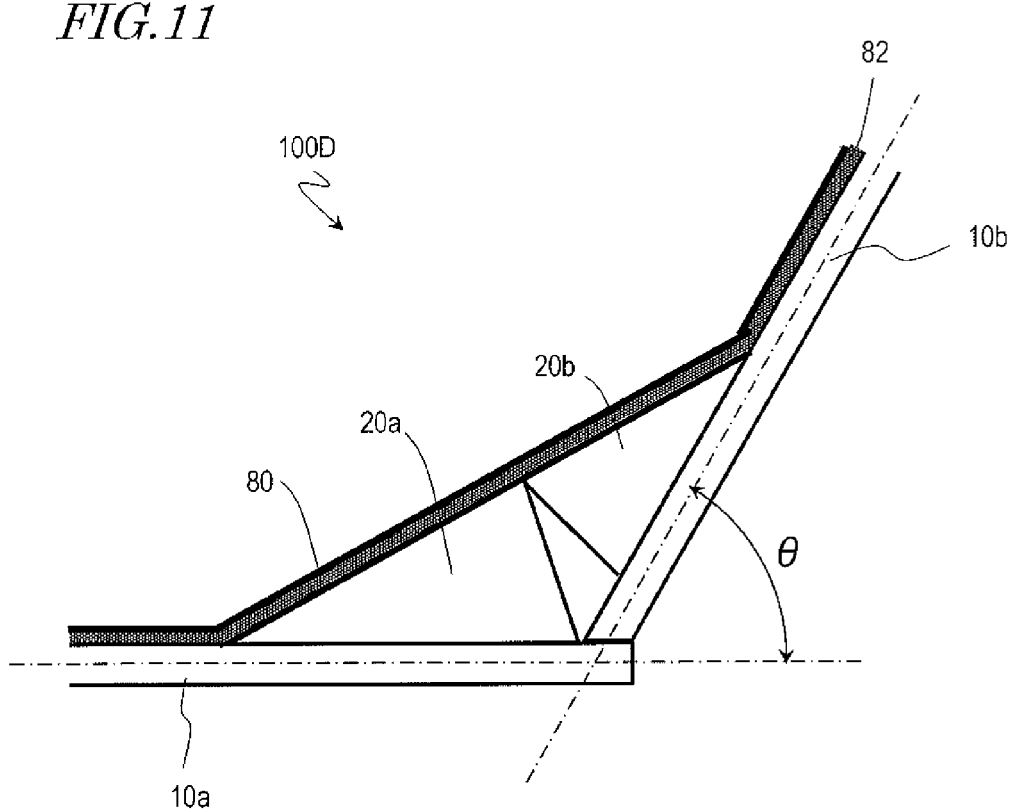
[FIG. 11] A schematic enlarged cross-sectional view of a joint between liquid crystal display panels 10a and 10b in the liquid crystal display device 100D.

A liquid crystal display device (a liquid crystal display device 100D shown in FIG. 11; to be described later) which is obtained through the production method described below will have less occurrence of air voids, thereby suppressing the aforementioned poor displaying. Hereinafter, with reference to FIG. 10, a production method of the liquid crystal display device 100D will be described. FIG. 10 is a schematic cross-sectional view for describing the production method for the liquid crystal display device 100D (FIG. 11).

First, as in FIG. 4(a), the display panel unit 100' having the liquid crystal display panel 10a, the liquid crystal display panel 10b, the light guide element 20a, and the light guide element 20b is provided.

Next, as shown in FIG. 10, with pressure being applied, the antireflection film 80' is attached over the viewer-side surface 17a of the liquid crystal display panel 10a, the outgoing face 22a of the light guide element 20a, the outgoing face 22b of the light guide element 20b, and the viewer-side surface 17b of the liquid crystal display panel 10b via an adhesion layer 82', whereby the liquid crystal display device 100D (FIG. 11) is obtained. Note that the adhesion layer 82' is provided on the antireflection film 80' in advance, for example.

The thickness of the adhesion layer 82' is greater than the thickness of the adhesion layer which is formed on the antireflection film 80' in a production step (FIG. 4) of the liquid crystal display device 100 (FIG. 1). Use of the thick adhesion layer 82' allows the antireflection film 80' to be attached along the aforementioned level difference or chipping, thereby suppressing occurrence of air voids.

FIG. 11 shows a schematic cross-sectional view of the liquid crystal display device 100D obtained through the production method described with reference to FIG. 10. As shown in FIG. 11, in the liquid crystal display device 100D, the antireflection film 80 is attached via a relatively thick adhesion layer 82, thereby suppressing occurrence of air voids.

For example, according to the production method described with reference to FIG. 10, even if level differences exist due to misalignment between the light guide elements 20*a* and 20*b*, the level differences can be filled over by the adhesion layer 82 as in a liquid crystal display device 100D' shown in FIG. 12(*a*), whereby occurrence of air voids is suppressed. FIG. 12(*b*) shows enlarged a portion where the light guide element 20*a* and the light guide element 20*b* of the liquid crystal display device 100D' abut. As shown in FIG. 12(*b*), in the liquid crystal display device 100D', the thickness X of the adhesion layer 82 at a portion where there is a level difference between the light guide element 20*a* and the light guide element 20*b* is greater than the size Y of the level difference along a direction perpendicular to the viewer-side surface of the liquid crystal display panel 10*a*, such that the adhesion layer 82 fills over the level difference.

It will be appreciated that the level difference can be filled over by forming the adhesion layer 82 with a thickness Xa which is greater than the size Y of the level difference. Moreover, by using an adhesive with an appropriate viscosity, even if the thickness Xa of the adhesion layer 82 is smaller than the size Y of the level difference, the level difference can be filled over as shown in FIG. 12(*b*). According to a study of the inventors, for example, by using an adhesive whose viscosity is in the range of no less than 50 Pa·s and no more than 5000 Pa·s, the thickness of the adhesion layer 82' can be adjusted so that the thickness Xa of the adhesion layer 82 is equal to or greater than the size d of the level difference (the size d of the level difference along a direction which is parallel to the viewer-side surface of the liquid crystal display panel 10*a*).

As described above, the light guide elements 20*a* and 20*b* can be produced by cutting out the incident faces 21*a* and 21*b* and the outgoing faces 22*a* and 22*b* from an optical fiber face plate in plate form, so as to define a triangular prism. Herein, the precision of cutting out is about ±0.1 mm. Moreover, the alignment precision of the light guide elements 20*a* and 20*b* is about ±0.1 mm. In this case, the size of the level difference between the light guide elements 20*a* and 20*b* (d shown in FIG. 9(*a*)) will be about 0.2 mm. By forming the adhesion layer 82 with a thickness of 0.2 mm or more by using a liquid adhesive whose viscosity is no less than 50 Pa·s and no more than 5000 Pa·s, any level difference with a size d of about 0.2 mm can be suitably filled over, and occurrence of air voids can be suppressed, as described above.

It is preferable that the thickness of the adhesion layer 82 is no less than 1.0 mm. The reason is that, if the thickness of the adhesion layer 82 is greater than 1.0 mm, the perceived depth of the screen may increase, causing the viewer to feel awkward. When forming the adhesion layer 82 with a thickness in the range of equal to or greater than d but less than Y by using a liquid adhesive whose viscosity is no less than 50 Pa·s and no more than 5000 Pa·s as described above, there is an advantage in that the thickness of the adhesion layer 82 can be easily made 1.0 mm or less, as compared to the case of forming an adhesion layer 82 whose thickness is greater than Y.

It is preferable to conduct the step of attaching the antireflection film 80' in a vacuum (preferably in the range from $1 \times 10^{-5}$ MPa to $5 \times 10^{-2}$ MPa) because occurrence of air voids will be further suppressed.

Although an example of attaching the antireflection film 80' having the adhesion layer 82' provided thereon is illustrated above, the adhesion layer 82 may be formed on the surface of the display panel unit 100', and thereafter the antireflection film 80' may be attached, as will be described below (FIGS. 13(*a*) and (*b*)).

First, as in FIG. 4(*a*), the display panel unit 100' is provided.

Next, as shown in FIG. 13(*a*), an adhesive is applied on the surface of the display panel unit 100' by using a dispenser 64, for example, thereby forming the adhesion layer 82.

Next, as shown in FIG. 13(*b*), the antireflection film 80' is attached with pressure being applied by the roll-shaped pressurizing member 60, whereby the liquid crystal display device 100D (FIG. 11) is obtained.

In the production method described with reference to FIG. 13, too, the antireflection film 80' is attached via the thick adhesion layer 82, whereby occurrence of air voids between the antireflection film 80 and the surface of the display panel unit 100' can be suppressed as in the production method described with reference to FIG. 10. Note that the step of forming the adhesion layer 82 is preferably conducted in a vacuum in order to suppress occurrence of air voids. Moreover, it is preferable that the adhesion layer 82 is formed with a thickness of no less than 0.2 mm and no more than 1.0 mm, as described above. Moreover, by making the thickness of the adhesion layer 82 larger than the size Y of the level difference (Y shown in FIG. 12(*b*)), level differences can be filled over for reasons similar to those described with reference to FIG. 12(*b*). Moreover, by making the thickness of the adhesion layer 82 smaller than the size Y of the level difference, too, a level difference can be filled over by using an adhesive whose viscosity is no less than 50 Pa·s and no more than 5000 Pa·s and adjusting the thickness of the adhesion layer 82' so that the thickness of the adhesion layer 82 is equal to or greater than the size d of the level difference (d shown in FIG. 12(*b*)).

As the adhesive, for example, a gel tackiness agent or a liquid adhesive is used. As the gel tackiness agent, silicone gel can be used, for example. As the liquid adhesive, a liquid adhesive having UV-curability can be used.

Use of an adhesive having UV-curability can facilitate the production process. As described above, the viscosity of the liquid adhesive is preferably no less than 50 Pa·s and no more than 5000 Pa·s. As the adhesive, what is obtained by allowing an adhesive to be semi-cured into a film (film adhesive) can be used. It is preferable that the viscosity of the film adhesive when melted is no less than 1000 Pa·s and no more than 5000 Pa·s.

In the case where a liquid adhesive is used, the adhesive may flow into the interspace between the light guide element 20*a* and the light guide element 20*b* (i.e., the interspace between the side face 23*a* of the light guide element 20*a* and the side face 23*b* of the light guide element 20*b*). The adhesive that has intruded in between the light guide element 20*a* and the light guide element 20*b* may not be cured. Therefore, sealing between the side face 23*a* and the side face 23*b* is preferable because a flow-in of the adhesive is suppressed. For example, a gap-sealing member 86 of resin that is formed so as to match the corner portion at which the side face 23*a* meets the side face 23*b* may be provided, thus sealing between the side face 23*a* and the side face 23*b* (FIG. 14(*a*)). Moreover, an adhesive may be applied at the corner portion at which the side face 23*a* meets the side face 23*b*, and cured to seal between the side face 23a and the side face 23b (FIG. 14(b) shows cured adhesive 87).

A flow-in of the adhesive can be suppressed by forming the light guide elements 20a and 20b so that there is no gap between the two. As shown in FIG. 15, for example, a light guide element 20b may be used which is produced so that the incident face 21b of the light guide element 20b overlaps the region including the frame region 30b and the peripheral display region 32b of the liquid crystal display panel 10b and that the side face 23b of the light guide element 20b abuts the side face 23a of the light guide element 20a, whereby the gap between the light guide element 20a and the light guide element 20b can be sealed.

Figure 16:
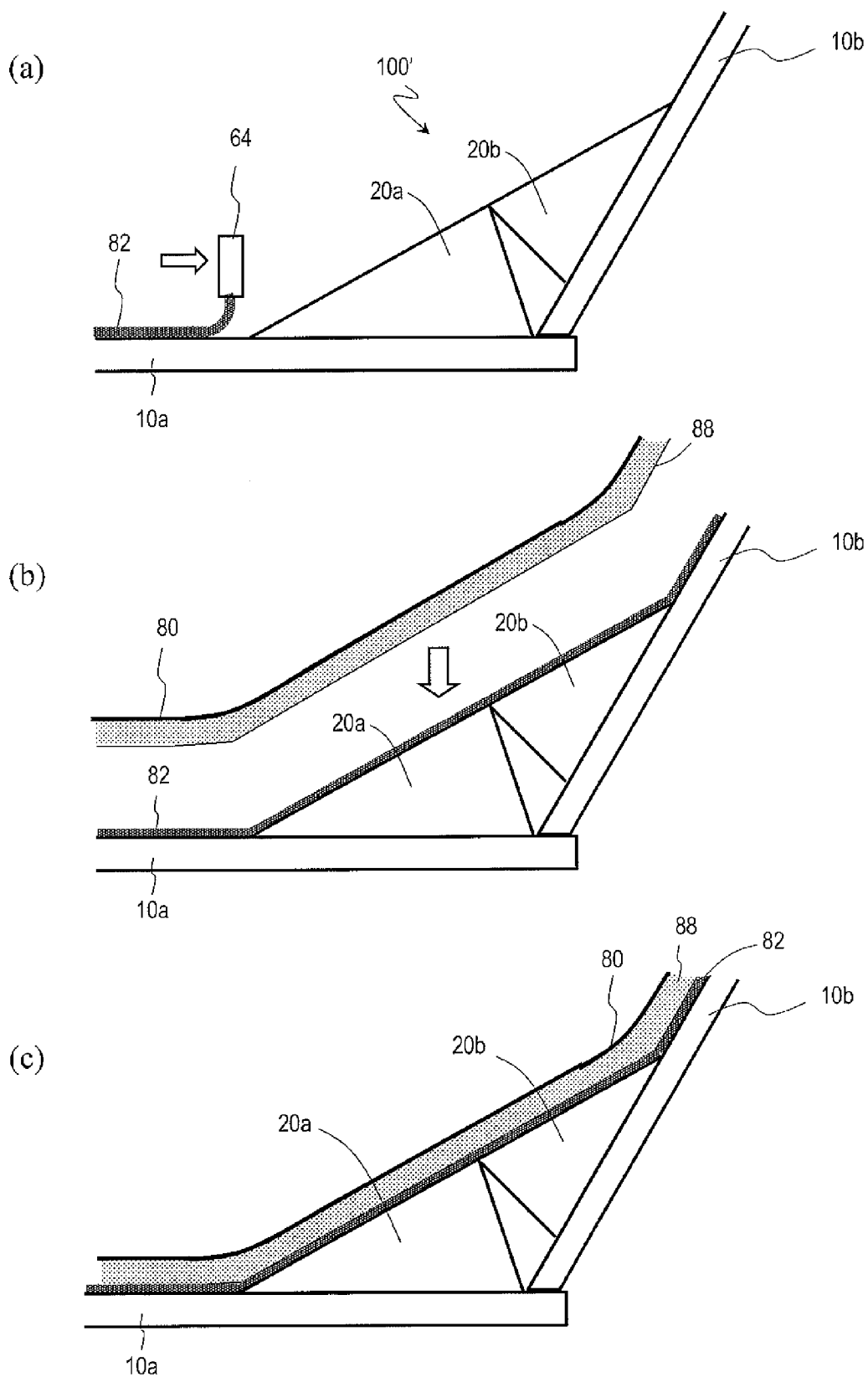
[FIGS. 16] (a) to (c) are schematic cross-sectional views for describing a production method for a liquid crystal display device 100E.

Next, a liquid crystal display device according to an embodiment of the present invention (a liquid crystal display device 100E shown in FIG. 17) will be described. A production method for the liquid crystal display device 100E will be described with reference to FIGS. 16(a) to (c).

First, as in FIG. 4(a), the display panel unit 100' is provided.

Next, as shown in FIG. 16(a), an adhesive is applied on the surface of the display panel unit 100' by using a dispenser 64, for example, thereby forming the adhesion layer 82.

Next, as shown in FIG. 16(b), a front face plate 88 having the antireflection film 80 formed thereon is provided, and is aligned onto the display panel unit 100'. The front face plate 88 is light-transmissive. Thereafter, in the direction shown by an arrow in FIG. 16(b), a relative movement of the front face plate 88 is caused with respect to the display panel unit 100'.

Next, as shown in FIG. 16(c), the front face plate 88 is attached onto the surface of the display panel unit 100' via the adhesion layer 82, whereby the liquid crystal display device 100E (FIG. 17) is obtained.

Figure 17:
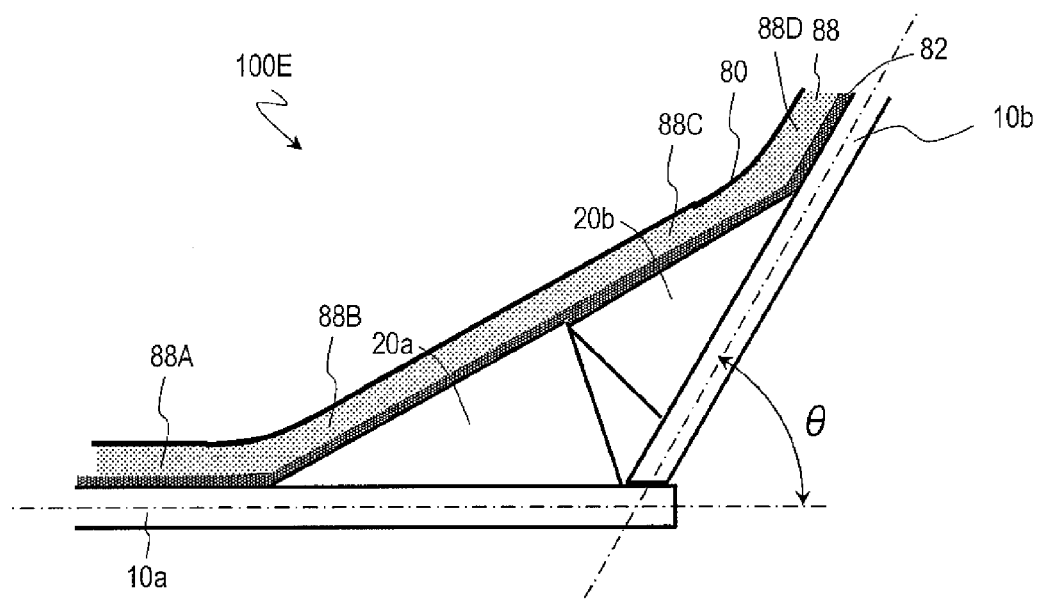
[FIG. 17] A schematic cross-sectional view of the liquid crystal display device 100E.

The front face plate 88 does not have a level difference as does the liquid crystal display device 100B (FIG. 6), nor is it chipped as is the liquid crystal display device 100C (FIG. 7). Therefore, the method described with reference to FIG. 16 has an advantage in that the antireflection film 80 can be attached without allowing an air void 95c or 95d to occur. FIG. 17 illustrates an example where the front face plate 88 is provided so as to cover the viewer-side surface of the liquid crystal display panel 10a, the outgoing face of the light guide element 20a, the outgoing face of the light guide element 20b, and the viewer-side surface of the liquid crystal display panel 10b; however, it suffices if the front face plate 88 is provided so as to at least cover the outgoing face of the light guide element 20a and the outgoing face of the light guide element 20b. So long as the front face plate 88 is provided in a manner of covering the outgoing face of the light guide element 20a and the outgoing face of the light guide element 20b, there are no influences of level differences and chipping as in the aforementioned liquid crystal display device 100B (FIG. 6) and the liquid crystal display device 100C (FIG. 7), whereby occurrence of air voids that may occur between the light guide element 20a and the light guide element 20b can be suppressed.

As shown in FIG. 17, the front face plate 88 includes a portion 88A disposed on the viewer's side of the liquid crystal display panel 10a, a portion 88B disposed on the viewer's side of the light guide element 20a, a portion 88C disposed on the viewer's side of the light guide element 20b, and a portion 88D disposed on the viewer's side of the liquid crystal display panel 10b. As shown in FIG. 17, within the front face plate 88, the corner portion at which the portion 88A disposed on the viewer's side of the liquid crystal display panel 10a meets the portion 88B disposed on the viewer's side of the light guide element 20a is a curved surface. Therefore, the portion of the surface of the front face plate 88 that corresponds to the aforementioned corner portion has no level difference, and the antireflection film 80 is attached along the surface, whereby occurrence of air voids is suppressed. As shown in FIG. 17, the corner portion at which the portion 88C disposed on the viewer's side of the light guide element 20b meets the portion 88D disposed on the viewer's side of the liquid crystal display panel 10b may also be a curved surface. For reasons similar to those mentioned above, occurrence of air voids is suppressed also at this corner portion. Thus, in the liquid crystal display device 100E, occurrence of air voids 95a and 95b as in the aforementioned liquid crystal display device 100A (FIG. 5) is suppressed.

Note that the portion 88A of the front face plate 88 that is disposed on the viewer's side of the liquid crystal display panel 10a may be formed so as to cover the entire viewer-side surface of the liquid crystal display panel 10a, or formed so as to cover a portion of the viewer-side surface of the liquid crystal display panel 10a. So long as the front face plate 88 is formed in a manner of at least covering the corner portion at which the viewer-side surface of the liquid crystal display panel 10a meets the outgoing face of the light guide element 20a, occurrence of air voids at the boundary between the viewer-side surface of the liquid crystal display panel 10a and the outgoing face of the light guide element 20a as in the liquid crystal display device 100A (FIG. 5) can be suppressed for the above-described reasons. Similarly, the portion 88D disposed on the viewer's side of the liquid crystal display panel 10b may also be formed so as to cover the entire viewer-side surface of the liquid crystal display panel 10b, or formed so as to cover a portion of the viewer-side surface of the liquid crystal display panel 10b.

In the above-described production method, the adhesion layer 82 is first provided and then the front face plate 88 is attached; however, the adhesion layer 82 may be previously provided on the rear face of the front face plate 88, and thereafter this may be attached onto the display panel unit 100'. In the above-described production method, the front face plate 88 having the antireflection film 80 provided thereon is attached onto the display panel unit 100'; however, after the front face plate 88 is attached onto the display panel unit 100', the antireflection film 80 may be provided on the surface of the front face plate 88.

For reasons similar to the above, the adhesion layer 82 preferably has a thickness of no less than 0.2 mm and no more than 1.0 mm. As the adhesive, adhesives similar to the above can be used, e.g., liquid adhesives, or gel tackiness agents, film adhesives, and the like. In order to suppress occurrence of air voids, the adhesion layer 82 is preferably formed in a vacuum.

The front face plate 88 is produced through cutting or injection molding by using an acrylic resin, for example. As the material of the front face plate 88, a transparent resin, such as polycarbonate, or glass may be used.

Hereinafter, a preferable construction of the display device of the present embodiment will be described.

Figure 18:
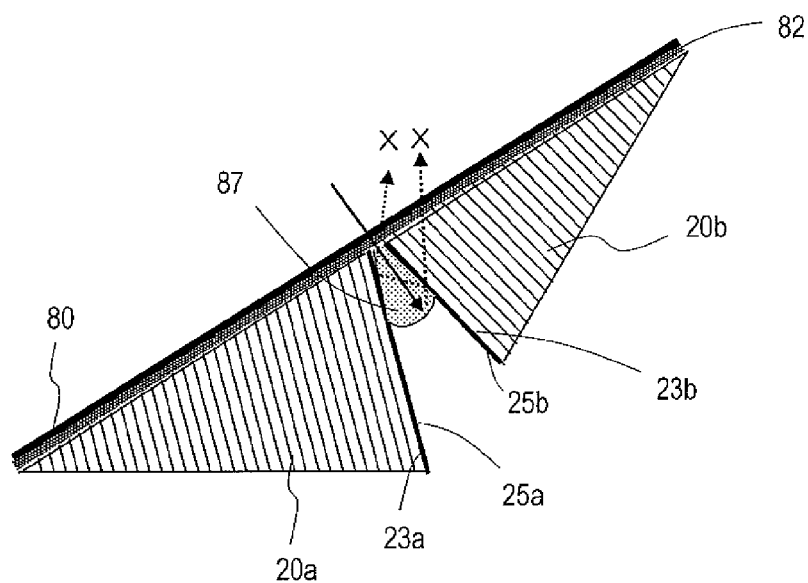
[FIG. 18] A schematic cross-sectional view for describing a display device in which light shielding layers 25a and 25b are provided.

Preferably, a light shielding layer 25a and a light shielding layer 25b are formed on the side face 23a of the light guide element 20a and the side face 23b of the light guide element 20b, respectively. For example, when adhesive 87 is applied at the corner portion where the side faces 23a and 23b meet for sealing between the side faces 23a and 23b (FIG. 14(b)), external light entering the cured adhesive 87 from between the light guide element 20a and the light guide element 20b might be reflected at the interface between the cured adhesive 87 and the air, or at the side faces 23a and 23b, so as to be emitted toward the viewer's side. As shown in FIG. 18, when the light shielding layers 25a and 25b are provided on the side faces 23a and 23b, the external light which has entered the cured adhesive 87 and which has been reflected at the interface between the cured adhesive 87 and the air or at the side faces 23a and 23b will be restrained from being emitted.

Figure 19:
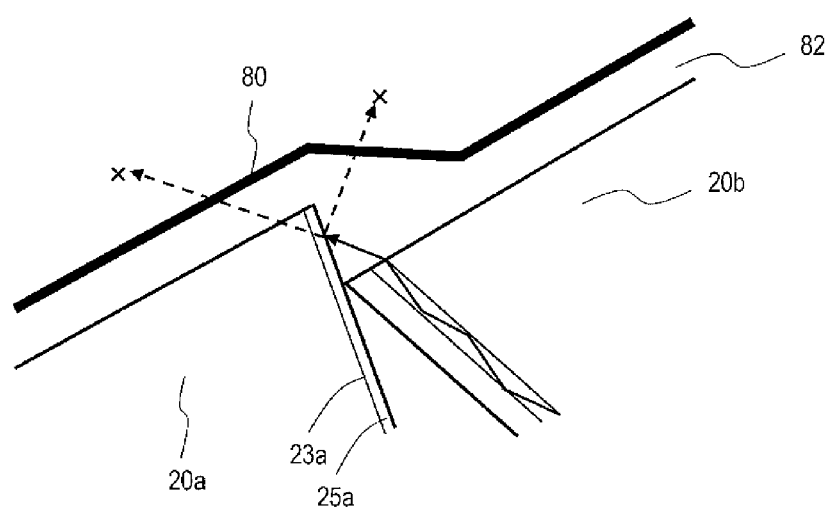
[FIG. 19] A schematic cross-sectional view for describing a display device in which a light shielding layer 25a is provided.

Moreover, when there is misalignment between the light guide elements 20a and 20b (e.g., the liquid crystal display device 100D' (FIG. 12)), if the light shielding layer 25a is provided, light being emitted from the light guide element 20b and entering the adhesion layer 82 will be restrained from entering the light guide element 20a, as shown by a broken line in FIG. 19. Moreover, reflection at the side face 23a of the light guide element 20a will also be suppressed.

The light shielding layers 25a and 25b can be provided on the side faces 23a and 23b via an adhesion layer, by using a film which is formed by mixing a light shielding material, e.g., carbon black, in an organic polymer material, e.g., polyester resin, for example. Moreover, a liquid ink composed of a pigment or dyestuff may be introduced on the side faces 23a and 23b of the light guide elements 20a and 20b (e.g., via printing or application), and dried or solidified.

By providing the light shielding layers 25a and 25b, for example, light not contributing to displaying is restrained from being emitted from between the side face 23a and the side face 23b. Therefore, the light shielding layers 25a and 25b will also be effective when provided on a display device which lacks a functional film, for example.

Although the above embodiment illustrates an example where an antireflection film is provided as a functional film, the functional film is not limited thereto. As the functional film, an antisoiling film, a hardcoat film (shock-absorbing film), or a touch panel film may be provided, for example. Any of these films is preferably provided by using methods similar to that for the liquid crystal display device 100D (FIG. 11) or the liquid crystal display device 100E (FIG. 17) for less occurrence of air voids.

An antisoiling film may include a base layer made of PET, an adhesive layer provided on one face of the base layer, and an antisoiling layer provided on the other face, for example. The antisoiling layer is obtained by forming a material having a high water repellency as well as oil repellency on the base layer by a known film-forming method. As the material having water repellency and oil repellency, a fluorine-type organic compound can be used, for example. Examples of the film-forming method include a vacuum evaporation technique and a wet coating technique.

A hardcoat film may include a base layer made of PET, an adhesive layer provided on one face of the base layer, and a hardcoat layer provided on the other face, for example. The hardcoat layer is obtained by forming an organic material such as acrylic resin or polyester resin, or an inorganic oxide-type material such as silica or alumina, on the base layer through a known film-forming method. It is preferable that the hardcoat layer has a pencil hardness of 2H or more.

Moreover, a film which serves two or more functions among an antireflection film, an antisoiling film, and a hardcoat film may be provided.

Figure 20:
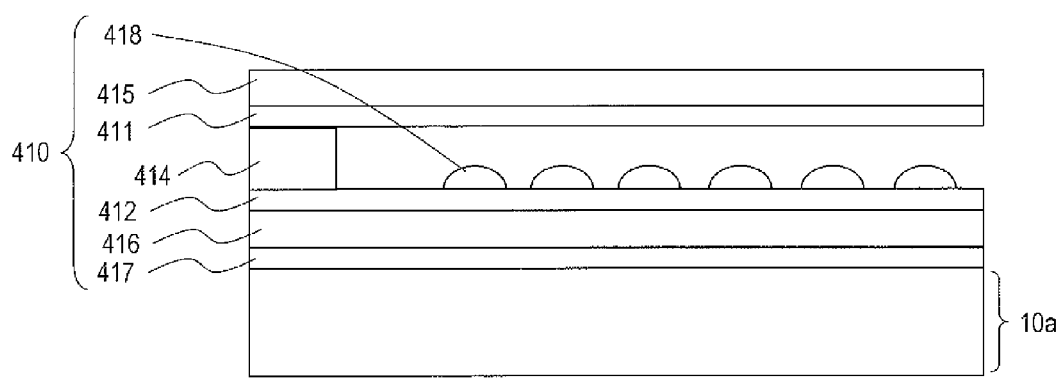
[FIG. 20] A schematic cross-sectional view for describing a touch panel film 410.

As a touch panel film, for example, any known touch panel film can be used, e.g., a resistive film type, a static capacitive coupling type, an infrared type, an ultrasonic type, or an electromagnetic coupling type. With reference to FIG. 20, an example of using a resistive film-type touch panel film will be described. As shown in FIG. 20, a touch panel film 410 includes an upper electrode plate (movable electrode plate) having an upper film 415 and an upper transparent electrically-conductive film 411, and a lower electrode plate (stationary electrode plate) having a lower film 416 and a lower transparent electrically-conductive film 412, such that the upper electrode plate and the lower electrode plate are attached together so as to oppose each other via an adhesion layer 414. PET is used as the material of the upper film 415 and the lower film 416, for example, whereas ITO is used as the material of the upper transparent electrically-conductive film 411 and the lower transparent electrically-conductive film 412, for example. On the surface of the lower transparent electrically-conductive film 412 of the lower electrode plate, a plurality of dot spacers 418 are disposed. The touch panel film 410 is attached on the viewer's side of the liquid crystal display panel 10a via a transparent adhesion layer 417. Inputs to the touch panel film 410 are made as the upper electrode plate comes into contact with the lower electrode plate when it is pressed by a finger or a pen.

Figure 21:
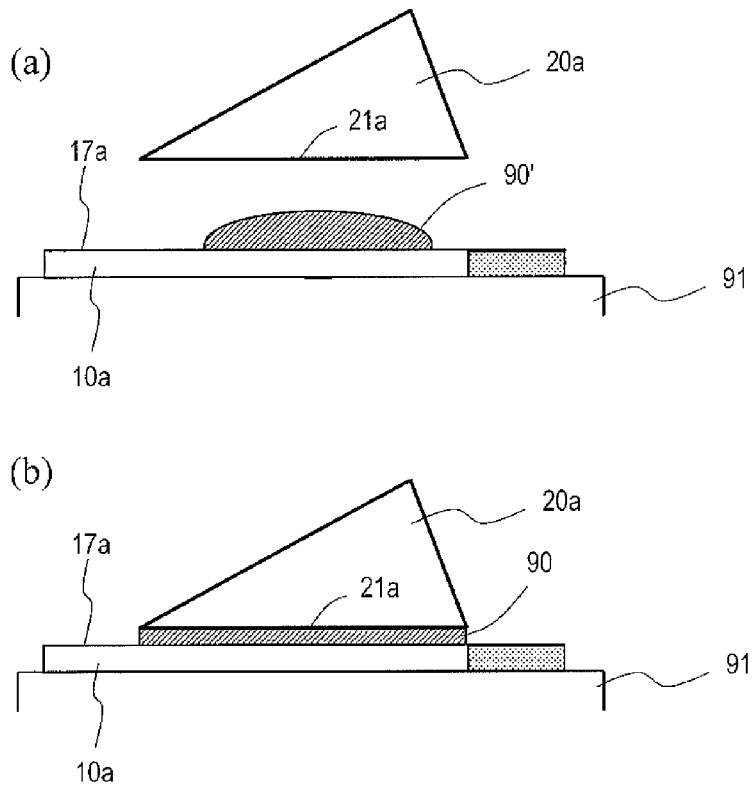
[FIGS. 21] (*a*) and (*b*) are schematic cross-sectional views for describing a step of attaching a liquid crystal display panel 10a and a light guide element 20a together.

The liquid crystal display panel 10a and the light guide element 20a can be attached together by a known method. For example, as shown in FIGS. 21(a) and (b), the liquid crystal display panel 10a and the light guide element 20a may be attached together via a buffer layer 90. It is preferable that the refractive index of the buffer layer 90 is close to the refractive index of the light guide element 20a and the refractive index of a member (e.g., the upper substrate 11a) that is on the viewer's side of the liquid crystal display panel 10a because interface reflection will be suppressed and the display quality will be improved. Moreover, this will improve the transmittance of light emitted from the backlight device 50a. Thus, there is an advantage in that an improved luminance and a reduced power consumption of the display device are realized.

With reference to FIGS. 21(a) and (b), an example of attaching together the liquid crystal display panel 10a and the light guide element 20a by using a UV-curing resin as the material of the buffer layer 90 will be described. FIGS. 21(a) and (b) are schematic cross-sectional views for describing a step of attaching the liquid crystal display panel 10a and the light guide element 20a together.

As shown in FIG. 21(a), while the liquid crystal display panel 10a is supported on a flat stage 91, an appropriate amount of UV-curing resin 90' is introduced onto the viewer-side surface 17a of the liquid crystal display panel 10a. Then, the incident face 21a of the light guide element 20a and the viewer-side surface 17a of the liquid crystal display panel 10a are placed so as to oppose each other. The UV-curing resin 90' may be added dropwise onto the viewer-side surface 17a of the liquid crystal display panel 10a, for example.

Next, as shown in FIG. 21(b), through a relative movement of the liquid crystal display panel 10a with respect to the light guide element 20a in a direction perpendicular to the viewer-side surface 17a, the liquid crystal display panel 10a and the light guide element 20a are attached together. The step of attaching together is preferably conducted in an ambient of reduced pressure so that there will be no air voids in the UV-curing resin 90'. At this time, it is preferable that the ambient of reduced pressure is in the range of $1.5 \times 10^{-4}$ MPa to $3.0 \times 10^{-3}$ MPa, for example.

Next, ultraviolet ray is irradiated to cure the UV-curing resin 90'.

In this manner, the liquid crystal display panel 10a and the light guide element 20a can be attached together via the buffer layer 90. Note that further heating may be conducted after ultraviolet irradiation, in order to promote curing.

As an adhesion member with which to attach the liquid crystal display panel 10a and the light guide element 20a together, a sheet-type member having tackiness may be used, e.g., a tacky sheet or a gel sheet. In the case of using a sheet-type member for attaching together, the sheet-type member is attached onto the viewer-side surface 17a of the liquid crystal display panel 10a, which is supported on the flat stage 91, with a pressure being applied by using a roll-shaped pressurizing member or the like. Then, the light guide element 20a is attached onto the liquid crystal display panel 10a. The step of attaching the liquid crystal display panel 10a and the light guide element 20a together is preferably conducted in an ambient of reduced pressure for reasons similar to the above. By using a sheet-type member having tackiness, even if the attaching-together fails in the production step due to air voids or extraneous objects, for example, the yield rate can be improved due to easy reworking.

As the antireflection film 80, a known antireflection film can be used.

As the antireflection film 80, an application-type low-reflection film (LR film) may be used, for example. An application-type low-reflection film is produced by applying a resin material to a specific film thickness onto a base, the resin material having a low-refractive index. By providing the application-type low-reflection film, the reflectance can be made about 1%.

Moreover, an antireflection film composed of a dielectric multilayer film (which may especially be referred to as an AR film) can also be used. A dielectric multilayer film is obtained by stacking two or more kinds of inorganic dielectric materials having different refractive indices to a specific film thickness onto a film of PET or the like, through vapor deposition or the like, for example. Due to an interference effect, the reflectance of the dielectric multilayer film can be made about 0.2%.

As described earlier, an antireflection film having a moth-eye structure can be used as the antireflection film. An antireflection film having a moth-eye structure is produced in the following manner, for example.

By providing an aluminum base, and through repetitive anodic oxidation steps and etching steps, a stamper having a porous alumina layer is produced, the porous alumina layer having a bump-dent structure on its surface such that the two-dimensional size and adjacent distance as observed from the normal direction of the surface are equal to or greater than 10 nm but less than 500 nm. Next, the stamper is pressed against a PET film having a UV-curing resin (e.g., a urethaneacrylate-type resin) introduced on its surface, for example, and ultraviolet irradiation is performed (e.g., ultraviolet with a wavelength of 365 nm is irradiated at 10 mW for 360 seconds), whereby an antireflection film composed of a resin film with the bump-dent structure transferred onto its surface is obtained, such that the two-dimensional size and adjacent distance as observed from the normal direction of the surface are equal to or greater than 10 nm but less than 500 nm. The reflectance of an antireflection film having a moth-eye structure can be made about 0.2%.

The display qualities of display devices in which antireflection films were used improved from a display device in which an application-type low-reflection film was used, to a display device in which a dielectric multilayer film was used, and to a display device in which an antireflection film having a moth-eye structure was used. Such differences in display quality are due to the different reflectances of the three types of antireflection films.

Although the above illustrates an example of using optical fiber face plates as the light guide elements 20a and 20b, sheet laminates in which a light-transmitting layers are stacked can also be used as the light guide elements 20a and 20b. A sheet laminate is a laminate of at least two or more types of light guide layers having different refractive indices, such that the light guiding portions are stacked in a direction which is perpendicular to the longitudinal direction (direction of light propagation), so as to be parallel to one another.

Figure 22:
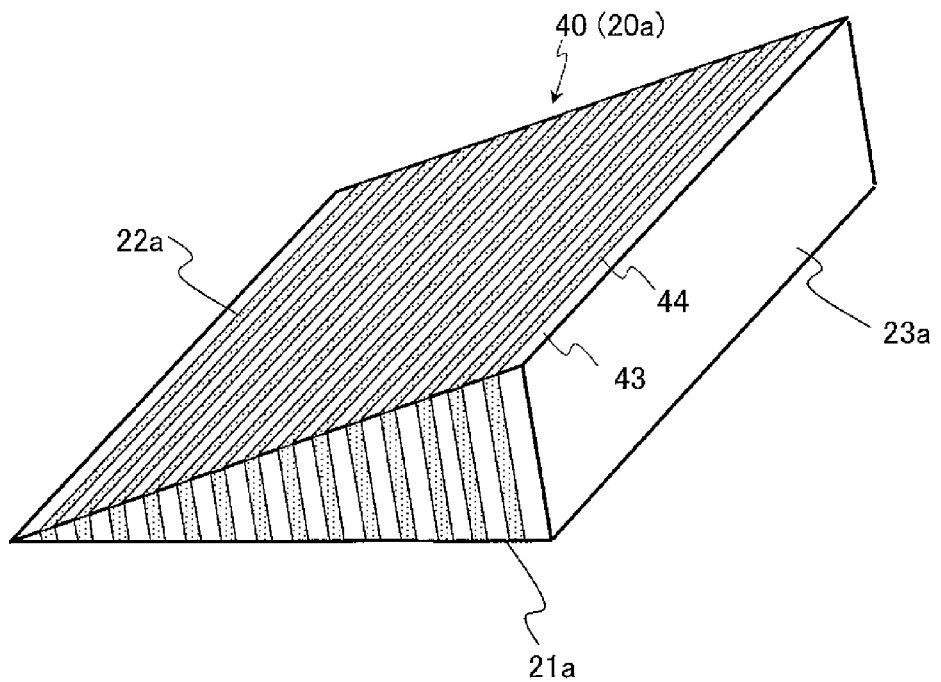
[FIG. 22] A schematic perspective view of a sheet laminate 40.

FIG. 22 shows a perspective view of a sheet laminate 40 of a triangular prism shape. By analogy with an optical fiber face plate, the sheet laminate 40 is composed of a laminate of light guide layers (base) 43 functioning as cores and low-refractive index resin layers 44 functioning as claddings. FIG. 22 also shows an incident face 21a, an outgoing face 22a, and a side face 23a of the case where the light guide element 20a is composed of the sheet laminate 40. As shown in FIG. 22, in the case where the sheet laminate 40 is used as the light guide element 20a, the side face 23a lies perpendicular to the direction in which the layers in the sheet are stacked. In the case where sheet laminates 40 are used as the light guide elements 20a and 20b, the light guide layers 43 and the low-refractive index resin layers 44 of the sheet laminates 40 are to be disposed parallel to the side face 23a of the light guide element 20a and the side face 23b of the light guide element 20b in FIG. 2. A display device in which the sheet laminates 40 are used as the light guide elements 20a and 20b operates under the same displaying principles as the liquid crystal display device 100 in which optical fiber face plates are used.

In the liquid crystal display device 100 of the present embodiment, optical fiber face plates are used for both light guide elements 20a and 20b; however, an optical fiber face plate may be used for one of the two light guide elements, and a sheet laminate may be used for the other.

Figure 23:
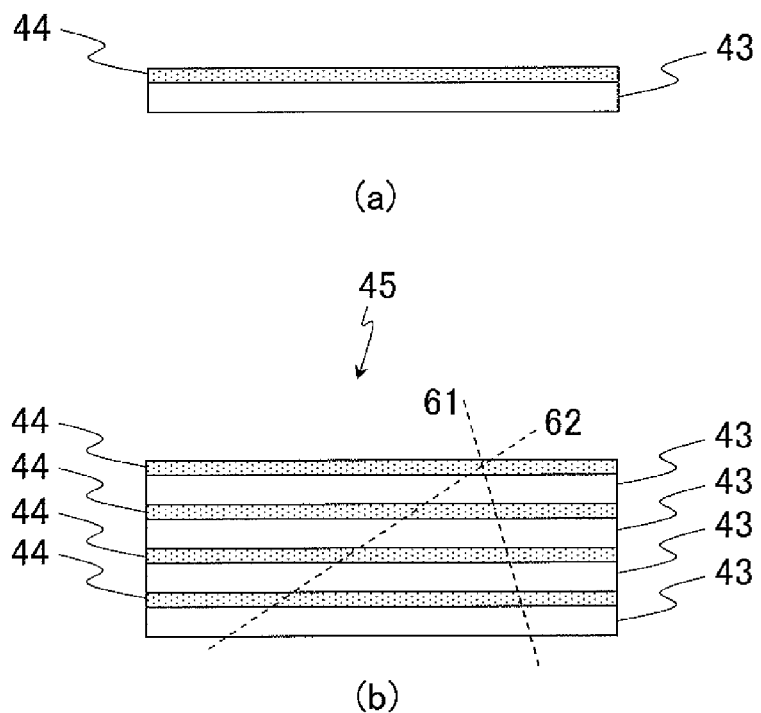
[FIG. 23] A diagram for describing production steps of the sheet laminate 40, where (a) shows a state before stacking, and (b) shows a state after stacking.

A method of producing a sheet laminate 40 will be described with reference to FIG. 23.

As shown in FIG. 23(a), on one surface of a base 43 composed of a light-transmitting material such as an acrylic resin or glass, a low-refractive index resin layer 44 containing a fluorine-type compound, which has a lower refractive index than that of the base 43, e.g., Opster (trade name) manufactured by JSR Corporation, is provided, and then is allowed to dry and cure. Next, after a plurality of layers of base are stacked with layers having tackiness or adhesiveness interposed therebetween, they are cured in such a manner that the respective layers will not delaminate. Thus, the laminate 45 having a plurality of stacked layers is obtained (FIG. 23(b)). As the material having tackiness or adhesiveness, a thermosetting resin, a thermoplastic resin, a UV-curing resin material, or the like can be used. The thickness of the layers having tackiness or adhesiveness should preferably be as thin as possible, so long as a high light-transmitting property, little light scattering ability, and a sufficient strength after curing are obtained. However, this thickness is preferably equal to or greater than the order of magnitude of light wavelength (several hundred nanometers). In the case where the base 43 and the low-refractive index resin layers 44 have tackiness or adhesiveness, there is no particular need to separately provide tacky layers or adhesion layers.

Next, the laminate 45 is cut at cut surfaces 61 and 62. By cutting the laminate 45 in directions which are oblique to the face on which the base 43 and the low-refractive index resin layers 44 adhere to each other, as indicated by the cut surfaces 61 and 62, and optionally polishing the cut surfaces for an improved exterior appearance, the sheet laminate 40 having the triangular prism shape shown in FIG. 22 is obtained.

In the sheet laminate 40, the base 43 acts as cores, whereas the low-refractive index resin layers 44 act as claddings. As described above, as the refractive index difference between the core and the cladding increases, the numerical aperture (NA) of an optical fiber increases, which is preferable because of increased light transmittance; however, there is no particular limitation as to the refractive index.

Alternatively, as the light guide elements 20a and 20b, light guide elements which allow incident light to be guided by utilizing metallic reflection may be used. An example of using a light guide element which utilizes metallic reflection as the light guide element 20a will be described. A light guide element 20a which utilizes metallic reflection includes a plurality of light guiding portions formed between the incident face 21a and the outgoing face 22a. The plurality of light guiding portions each include a transparent portion, such that at least a portion of the side face of the transparent portion has a metal portion. Light entering from the incident face 21a of the light guide element 20a propagates through the transparent portions, and goes out at the outgoing face 22a. At this time, light entering the transparent portions propagates within the transparent portions while being reflected by the metal portions provided on the side faces of the transparent portions. As a result, in the light guide element 20a, the transparent portions function as the light guiding portions.

Figure 24:
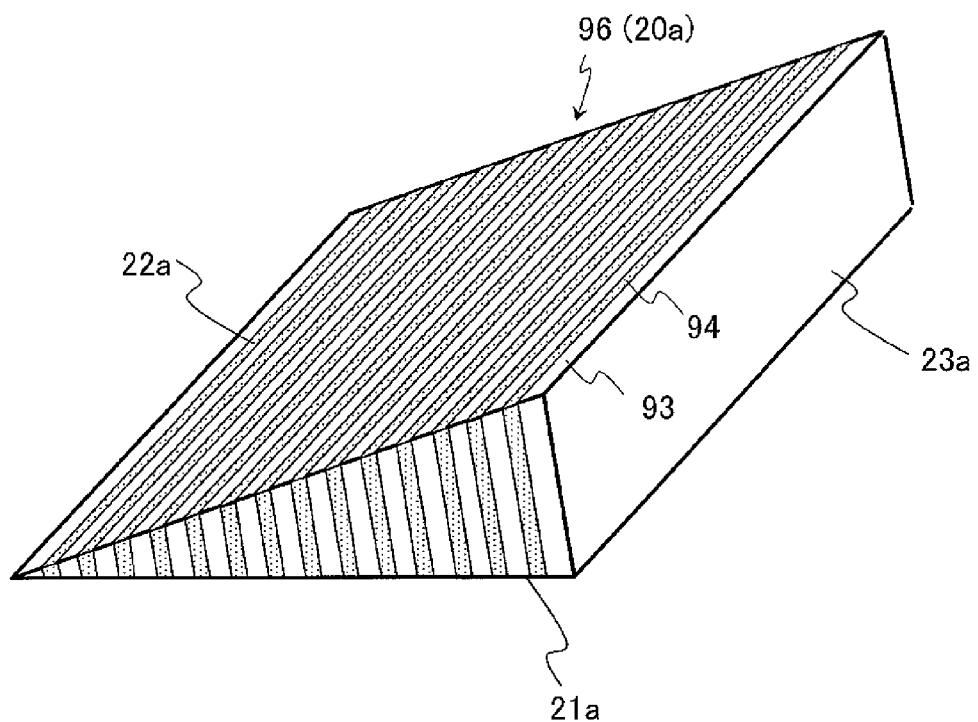
[FIG. 24] A schematic perspective view of a sheet laminate 96.

As a light guide element utilizing metallic reflection, a sheet laminate in which a plurality of transparent layers and a plurality of metal layers are stacked can be used, for example. FIG. 24 is a perspective view schematically showing a sheet laminate 96 of a triangular prism shape for use as the light guide element 20a, in which a plurality of transparent layers and a plurality of metal layers are stacked. The sheet laminate 96 is a laminate in which transparent layers 93 and metal layers 94 are stacked in parallel to one another. In the sheet laminate 96, the transparent layers 93 and the metal layers 94 are stacked so as to be parallel to one another along a direction which is perpendicular to the length direction (direction of light propagation). The direction in which the transparent layers 93 and the metal layers 94 are stacked is a direction which is perpendicular to the side face 23a of the light guide element 20a. Light entering the light guide element 20a at the incident face 21a propagates through the transparent layers 93 in parallel to the side face 23a, and is emitted from the outgoing face 22a toward the viewer. In this case, light entering the transparent layers 93 propagates through the transparent layers 93 while being reflected by the adjoining metal layers 94.

As the light guide elements 20a and 20b, it is possible to use those having a plurality of light guiding portions, including substantially cylindrical transparent portions at least a portion of whose side face is covered by a metal portion. In this case, light entering a transparent portion propagates through the transparent portion while being reflected at the metal portions provided on the side faces of the transparent portion. In other words, each transparent portion functions as a light guiding portion. In this case, the light guide element 20a has a cross section which is similar to that of the light guide element 20a shown in FIG. 1 and FIG. 2. In other words, in the light guide element 20a, the transparent portions are formed so that their length direction is aligned parallel to the side face 23a of the light guide element 20a. Similarly in the light guide element 20b, the transparent portions are to be formed in parallel to the side face 23b.

Using sheet laminates 96 as the light guide elements 20a and 20b provide the following advantages. While light enters the incident face 21a at various angles, a sheet laminate 96 is able to guide all light, irrespective of the incident angle, because it utilizes metallic reflection at the metal layers 94. Moreover, a sheet laminate 96 enables propagation in a wide range of incident angles, thereby providing an advantage in that the displayed image has a wide viewing angle. Moreover, since the transparent layers 93 do not need to be have any particular refractive index but only needs to be transparent, there is a wide range of materials for the transparent layers 93 to choose from. Moreover, since a material with a high transmittance can be selected regardless of the refractive index, bright displaying is achieved.

For example, the sheet laminate 96 is obtained by: using a vapor deposition technique or a sputtering technique to form a thin film of the metal layer 94, which has a high light reflectance, e.g., aluminum or silver, on one surface of the transparent layer 93, which is made of a light-transmitting material such as an acrylic resin or glass; and thereafter cutting it in a similar manner to FIG. 23(b).

The plurality of metal layers of the sheet laminate 96 preferably include metal layers having a thickness of no less than 100 nm and no more than 5 μm. If the metal layers have a thickness less than 100 nm, adequate light reflection characteristics may not be obtained. If the metal layers 94 have a thickness greater than 5 μm, the proportion which the transparent layers 93 account for in the incident face of the sheet laminate 96 decreases, which is not preferable because it induces a lowered light transmittance and lowered display luminance. Note that the production time and cost will increase as a film which is made by a vapor deposition technique or a sputtering technique increases in thickness (e.g. so as to be thicker than 1 μm); therefore, it is preferable that the plurality of metal layers include a metal layer whose thickness is 1 μm or less. It is preferable that all metal layers in the sheet laminate 96 have a thickness within the aforementioned range; however, some metal layers may have a thickness outside the above range.

Next, with reference to FIG. 25, the angle ($\theta$) between the liquid crystal display panel 10a and the liquid crystal display panel 10b in the liquid crystal display device 100, and exemplary design values of the light guide elements 20a and 20b will be described.

Figure 25:
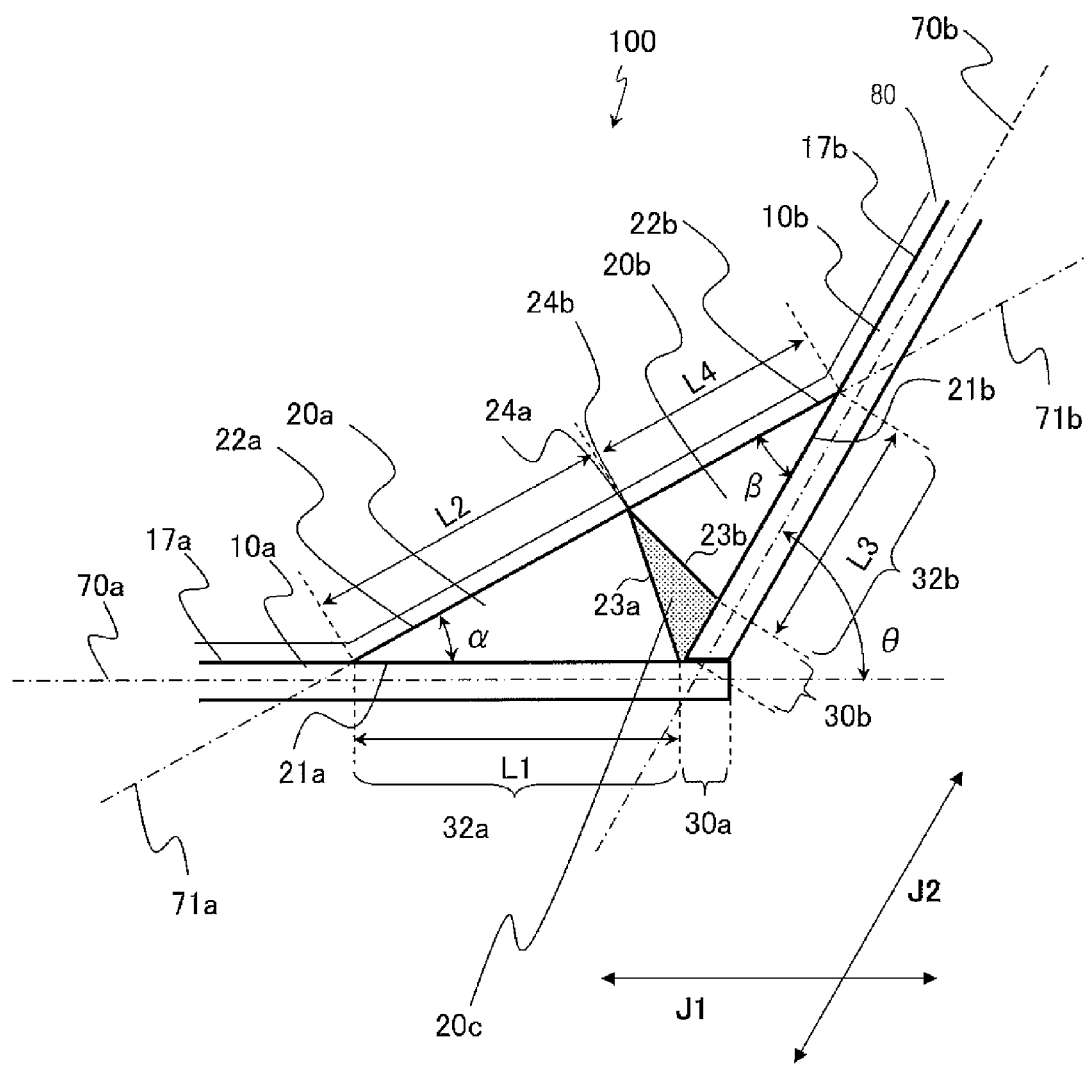
[FIG. 25] A schematic diagram for describing an example of an angle θ defined by the liquid crystal display panel 10a and the liquid crystal display panel 10b and exemplary design values of the light guide elements 20a and 20b.

FIG. 25 is a cross-sectional view schematically showing the relationship between the liquid crystal display panels 10a and 10b and the light guide elements 20a and 20b. The direction of a plane which is parallel to the viewer-side surface 17a of the liquid crystal display panel 10a is indicated by a dot-dash line 70a, whereas the direction of a plane which is parallel to the viewer-side surface 17b of the liquid crystal display panel 10b is indicated by a dot-dash line 70b. Since the incident face 21a of the light guide element 20a is parallel to the viewer-side surface 17a of the liquid crystal display panel 10a, the line 70a is parallel to the incident face 21a. Similarly, the line 70b is parallel to the incident face 21b of the light guide element 20b. Moreover, the direction of a plane which is parallel to the outgoing face 22a of the light guide element 20a is indicated by a dot-dash line 71a, whereas a direction which is parallel to the outgoing face 22b of the light guide element 20b is indicated by a dot-dash line 71b.

The angle between the line 70a and the line 70b is equal to the angle $\theta$ between the viewer-side surface 17a of the liquid crystal display panel 10a and the viewer-side surface 17b of the liquid crystal display panel 10b. The angle between the line 70a and the line 71a is designated $\alpha$, and the angle between the line 70b and the line 71b is designated $\beta$. $\alpha$ and $\beta$ are vertex angles of the triangular prism.

Moreover, lengths of the incident faces 21a and 21b and the outgoing faces 22a and 22b of the light guide elements 20a and 20b, in a cross section perpendicular to their longitudinal directions, are set as follows.

L1: length of the incident face 21a of the light guide element 20a

L2: length of the outgoing face 22a of the light guide element 20a

L3: length of the incident face 21b of the light guide element 20b

L4: length of the outgoing face 22b of the light guide element 20b

Assuming that α=β=θ/2, the angle between the line 70a and the line 71a and the angle between the line 70b and the line 71b are equal. Since α+β=θ in this case, the line 71a is parallel to the line 71b. This means that the outgoing face 22a and the outgoing face 22b are coplanar. Moreover, as described earlier, the end 24a of the outgoing face 22a abuts the end 24b of the outgoing face 22b in the liquid crystal display device 100. Therefore, the line 71a and the line 71b form one continuous straight line. That is, the outgoing face 22a and the outgoing face 22b constitute one continuous plane. For this reason, the liquid crystal display device 100 has a better appearance and a higher image display quality than in the case where the outgoing faces are not coplanar.

If L1 and L2 are not equal, the image will be enlarged or reduced. If L1<L2, an image which is formed in the peripheral display region 32a of the liquid crystal display panel 10a is enlarged by the light guide element 20a when displayed on the viewer's side. In this case, the peripheral display region 32a needs to form a compressed image relative to the image that is formed in a central display region 33a, which is a region of the display region 31a other than the peripheral display region 32a, and thus trouble and cost are incurred. On the other hand, if L1>L2, an image which is formed in the peripheral display region 32a of the liquid crystal display panel 10a is reduced by the light guide element 20a when displayed on the viewer's side. Similarly to the case where L1<L2, trouble and cost are incurred. The methods of enlarging or reducing an image will be described later.

Thus, it is preferable that L1 and L2 are equal in length. This would mean that the shape of a cross section of the light guide element 20a (a cross section which is perpendicular to the longitudinal direction) is an isosceles triangle. In this case, the overall shape of the light guide element 20a is an isosceles triangular prism.

For similar reasons, it is also preferable in the light guide element 20b that L3 and L4 are equal in length, so that the overall shape is an isosceles triangular prism.

Thus, the shapes of the cross sections of the optimum light guide elements 20a and 20b which are perpendicular to their longitudinal directions are mutually similar isosceles triangles.

This is only an optimum scenario, and it is not a requirement that α=β=θ/2, and it is not a requirement that L1=L2 and L3=L4.

As indicated below, the volume of the light guide element 20a is larger than the volume of the light guide element 20b. As shown in FIG. 25, L1>L3 and L2>L4. Moreover, as described above, the cross section of the light guide element 20a and the cross section of the light guide element 20b are mutually similar isosceles triangles. Therefore, the area of a cross section which is perpendicular to the longitudinal direction of the light guide element 20a is greater than the area of a cross section which is perpendicular to the longitudinal direction of the light guide element 20b. As is shown in FIG. 3, the light guide element 20a and the light guide element 20b are triangular prisms which have approximately the same length along the longitudinal direction. Therefore, the volume of the light guide element 20a is larger than the volume of the light guide element 20b. This is because, as described earlier, the frame region 30a of the liquid crystal display panel 10a overlaps the side face 18b of the liquid crystal display panel 10b in the liquid crystal display device 100. Conversely, in the case where the side face of the liquid crystal display panel 10a is arranged to overlap the frame region 30b of the liquid crystal display panel 10b, the volume of the light guide element 20b becomes larger than the volume of the light guide element 20a.

For example, exemplary design values of the light guide elements 20a and 20b as described later are L1=L2=14.9 mm and L3=L4=10.9 mm. In this case, the volume of the light guide element 20a is about 1.87 times as large as the volume of the light guide element 20b.

Figure 28:
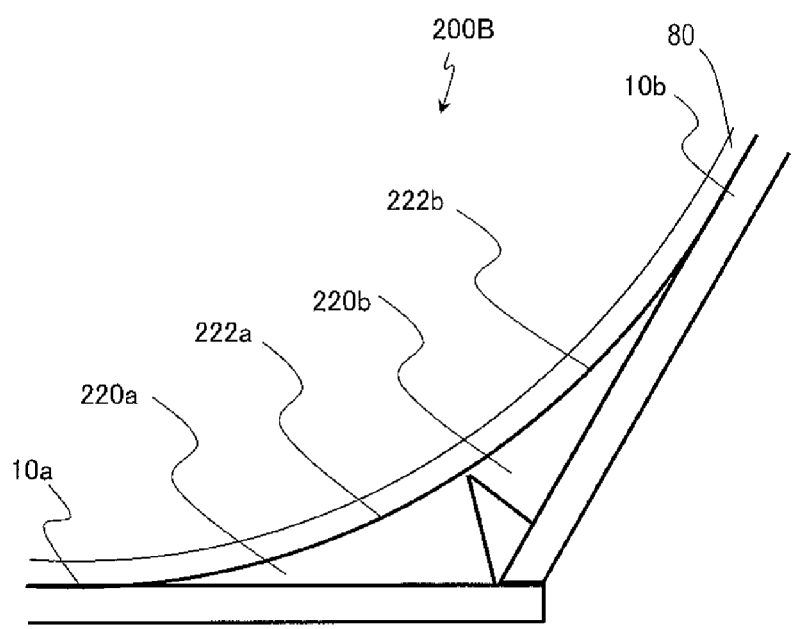
[FIG. 28] A schematic cross-sectional view of another liquid crystal display device 200B according to an embodiment of the present invention.

An example where the light guide elements have a triangular prism shape has been illustrated; however, even if the light guide elements are not triangular prism-shaped, the volume of one of the light guide element will be larger than the volume of the other light guide element. For example, as in a liquid crystal display device 200B (FIG. 28) described later, in the case where each of an outgoing face 222a of a light guide element 220a and an outgoing face 222b of a light guide element 220b is a portion of a cylindrical surface, the volume of the light guide element 220a is also larger than the volume of the light guide element 220b.

Note that a region 20c (dotted area in FIG. 25) which is surrounded by the side face 23a of the light guide element 20a, the side face 23b of the light guide element 20b, and a portion of the viewer-side surface 17b of the liquid crystal display panel 10b that corresponds to the frame region 30b is an ineffective region not contributing to displaying. Therefore, the region 20c may be a gap; alternatively, a member which is composed of a resin material or the like may be placed therein. Moreover, as has been indicated with reference to FIG. 15, a portion of the light guide element 20a or 20b may be formed so as to protrude into the region 20c. In that case, the overall shape of the light guide element will be different from the aforementioned isosceles triangular prism. The above discussion only intends that the shape of the effective region be an isosceles triangular prism, and the effects will not be lost even if the light guide element protrudes into the ineffective region, such that the overall shape is no longer an isosceles triangular prism.

Design values of the liquid crystal display device 100 of the present embodiment are shown below.

α=β=θ/2=30°

L1=L2=14.9 mm

L3=L4=10.9 mm

The width of each of the frame regions 30a and 30b is 4 mm.

Next, a liquid crystal display device 200A according to another embodiment will be described.

Figure 26:
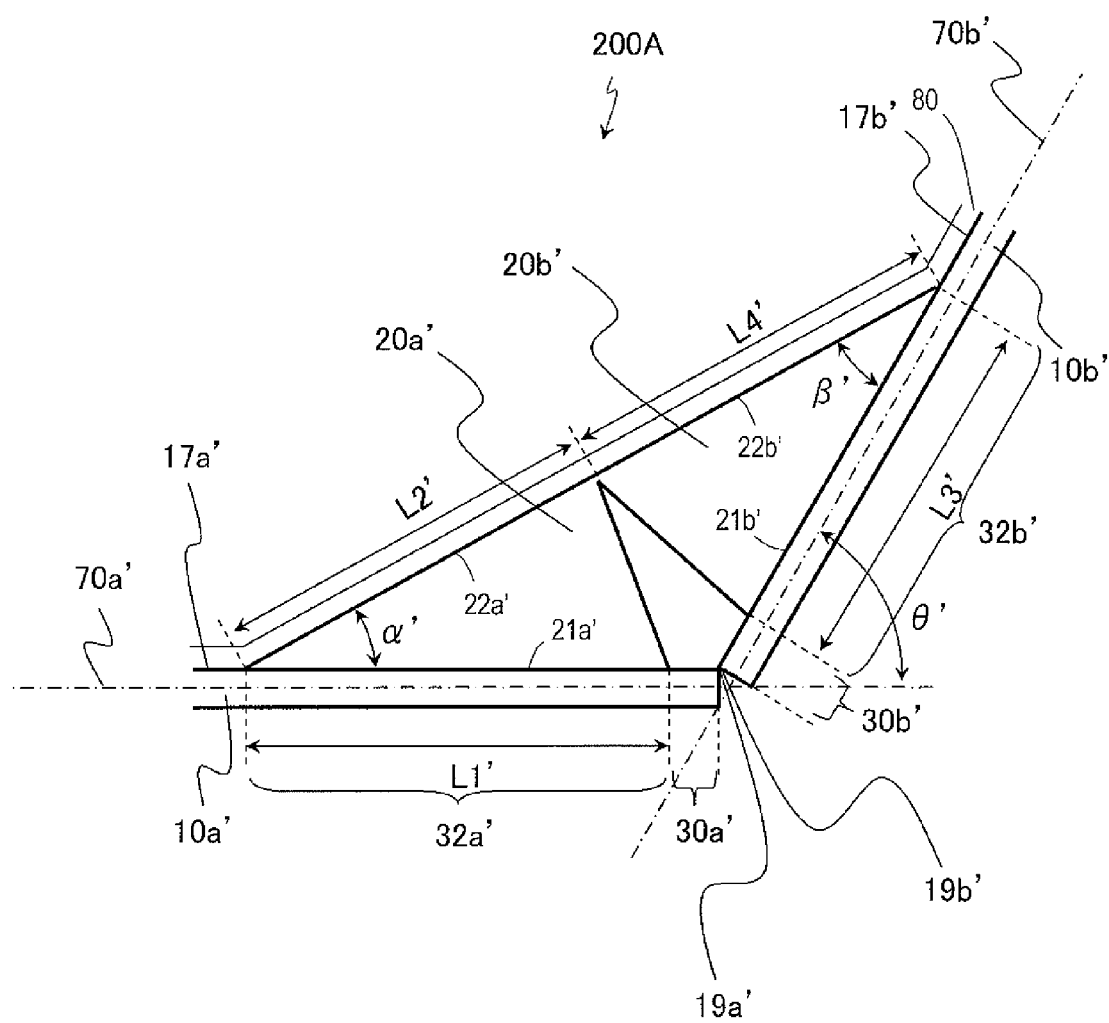
[FIG. 26] A schematic cross-sectional view of a liquid crystal display device 200A.

FIG. 26 is a cross-sectional view of the liquid crystal display device 200A. The liquid crystal display device 200A includes liquid crystal display panels 10a' and 10b' similar to the liquid crystal display panels 10a and 10b of the liquid crystal display device 100, and light guide elements 20a' and 20b'. In the liquid crystal display device 200A, the liquid crystal display panels 10a' and 10b' are disposed so that their viewer-side edges 19a' and 19b' abut each other at an angle θ'. Note that the angle θ' is an angle between a direction 70a' which is parallel to a viewer-side surface 17a' of the liquid crystal display panel 10a' and a direction 70b' which is parallel to a viewer-side surface 17b' of the liquid crystal display panel 10b'. Moreover, the light guide elements 20a' and 20b' are disposed respectively in the portions of the viewer-side surfaces 17a' and 17b' of the liquid crystal display panels 10a' and 10b' that pertain to peripheral display regions 32a' and 32b'.

The light guide elements 20a' and 20b' have a triangular prism shape, such that light going out of the peripheral display regions 32a' and 32b' is allowed to be emitted toward the viewer's side by the light guide elements 20a' and 20b'. As a result, images which are formed in the peripheral display regions 32a' and 32b' are displayed on the viewer's side of the light guide elements 20a' and 20b', whereby the frame regions 30a' and 30b' are obscured and a jointless image is displayed.

The liquid crystal display device 100 and the liquid crystal display device 200A differ in terms of where the two display panels are connected. As described above, in the liquid crystal display device 100, the side face 18b of the liquid crystal display panel 10b overlaps the frame region 30a of the liquid crystal display panel 10a; however, in the liquid crystal display device 200A, the viewer-side edges 19a' and 19b' of the liquid crystal display panels 10a' and 10b' abut each other.

In the liquid crystal display device 200A, the light guide elements 20a' and 20b' have the following design values.

$$\alpha' = \beta' = \theta'/2 = 30°$$

$$L1' = L2' = L3' = L4' = 25.7 \text{ mm}$$

$\alpha'$ and $\beta'$ are vertex angles of the light guide elements 20a' and 20b', which are triangular prisms. L1' and L2' are cross-sectional lengths of the incident face 21a' and the outgoing face 22a' of the light guide element 20a', respectively, whereas L3' and L4' are cross-sectional lengths of the incident face 21b' and the outgoing face 22b' of the light guide element 20b', respectively. The width of the frame regions 30a' and 30b' is 4 mm, as in the liquid crystal display device 100.

Comparisons between the volumes of the light guide elements 20a and 20b of the liquid crystal display device 100 and the volumes of the light guide elements 20a' and 20b' of the liquid crystal display device 200A are shown below.

$$20a:20a' = 34:100$$

$$20b:20b' = 18:100$$

In the liquid crystal display device 100, the volumes of the light guide element 20a and the light guide element 20b were reduced to about ⅓ and about ⅕ of those in the liquid crystal display device 200A. In the liquid crystal display device 100, the volumes of the light guide elements 20a and 20b can be kept small because the frame region 30a of the liquid crystal display panel 10a is overlapped by the side face 18b of the liquid crystal display panel 10b. Thus, the liquid crystal display device 100 makes it possible to obtain similar effects to those of the liquid crystal display device 200A, in spite of the reduced amount of costly light guide element material used, and therefore is very useful.

In the liquid crystal display device 200A, the viewer-side edges 19a' and 19b' of the liquid crystal display panels 10a' and 10b' abut each other, and L1'=L2'=L3'=L4', such that the volume of the light guide element 20a' is equal to the volume of the light guide element 20b'. In the liquid crystal display device 100, as described above, L3 and L4 are smaller than L1 and L2, respectively. That is, the volume of the light guide element 20b is smaller than the volume of the light guide element 20a. The light guide element 20a is smaller in volume than the light guide elements 20a' and 20b', but the light guide element 20b can have an even smaller volume.

The liquid crystal display device 200A is easy to produce and incurs low cost because it does not require a large-area light guide element as does the conventional display device described in Patent Document 1-3 mentioned above. However, in the display device 100, the light guide elements can be made even smaller in size. Therefore, the liquid crystal display device 100 makes possible a further cost reduction.

Figure 27:
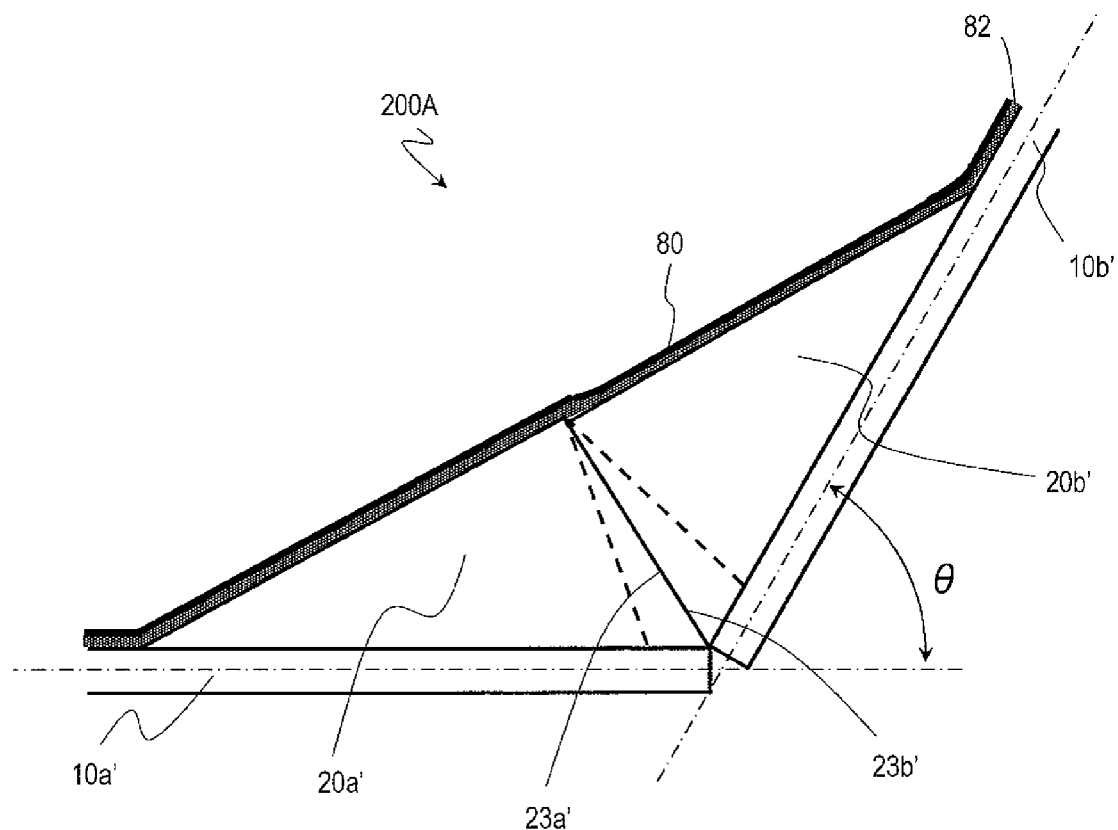
[FIG. 27] A schematic cross-sectional view for describing the construction for sealing the gap between light guide elements 20a' and 20b' in the liquid crystal display device 200A.

As shown in FIG. 26, as in the liquid crystal display device 100, an antireflection film 80 is attached via an adhesion layer onto the viewer-side surface 17a' of the liquid crystal display panel 10a', the outgoing face 22a' of the light guide element 20a', the outgoing face 22b' of the light guide element 20b', and the viewer-side surface 17b' of the liquid crystal display panel 10b' of the liquid crystal display device 200A. As shown in FIG. 27, in the liquid crystal display device 200A, the gap between the light guide element 20a' and the light guide element 20b' can be sealed by forming the light guide element 20a' and the light guide element 20b' in such a manner that the side face 23a' of the light guide element 20a' abuts the side face 23b' of the light guide element 20b'. Therefore, when providing the adhesion layer 82, a flow-in of an adhesive in between the light guide elements 20a' and 20b' can be suppressed.

Light-diffusing layers may be provided on the viewer's side of the outgoing faces 22a and 22b of the light guide elements 20a and 20b. By providing light-diffusing layers, light outgoing from the outgoing face is diffused, thus producing an effect of expanding the viewing angle of the liquid crystal display device 100. As the light-diffusing layers, known light-diffusing layers or light-diffusing elements can be use. For example, scattering films containing microparticles, diffuse reflections having a surface with minute bumps and dents randomly formed thereon, prism sheets such as BEF from Sumitomo 3M COMPANY, or light-diffusing elements such as microlens arrays can be used.

Moreover, the outgoing faces 22a and 22b of the light guide elements 20a and 20b do not need to be planar, and light guide elements whose outgoing faces are curved surfaces can be used. In the liquid crystal display device 100, cross sections of the light guide elements 20a and 20b (cross sections perpendicular to their longitudinal directions) are triangles, and the outgoing faces 22a and 22b present straight lines in their cross sections. However, as in the light guide elements 220a and 220b of the liquid crystal display device 200B shown in FIG. 28, for example, outgoing faces 222a and 222b may each present an arc of a circle in their cross sections. The outgoing faces 222a and 222b in this case present cylindrical surfaces. Of course, the outgoing faces of the light guide elements do not need to be planes or cylindrical surfaces, and can be freely designed in any shape, so long as the thickness increases toward the frame region and away from the peripheral display region.

Note that, in the case where the distance between the liquid crystal layer of the liquid crystal display panel 10a or 10b and the light guide element is large, or a light-diffusing layer exists therebetween, an image which is seen through the light guide elements may be blurred. Therefore, it is preferable that the thicknesses of the viewer-side substrate (counter substrate 11a, 11b) of the liquid crystal display panel 10a, 10b and the optical film portion 15a, 15b provided on the viewer's side of the viewer-side substrate is as small as possible, (e.g., the thickness of the substrate is 0.3 mm; and the thickness of the optical film portion is 0.1 mm), and that there is a high transmittance for parallel light (i.e., there is little diffusion). For similar reasons, it is preferable to use a material not containing any particles that diffuse light as the adhesive (including a tackiness agent) that is provided on the viewer's side of each liquid crystal display panel, e.g., a tacky film included in the optical film portion 15a, 15b.

In the liquid crystal display device 100, a side face 58b (shown in FIG. 2) of the liquid crystal display panel 10a of the backlight device 50b, which is disposed on the opposite side of the liquid crystal display panel 10*b* from the viewer's side, is parallel to the viewer-side surface 17*a* of the liquid crystal display panel 10*a*. In other words, the side face 58*b* is formed obliquely so that the angle between the side face 58*b* and the viewer-side surface 17*b* of the liquid crystal display panel 10*b* is equal to the angle θ between the viewer-side surface 17*a* and the viewer-side surface 17*b*. Moreover, a portion of the side face 58*b* of the backlight device 50*b* overlaps the frame region 30*a* of the liquid crystal display panel 10*a*. With this construction, the display region 31*b* of the liquid crystal display panel 10*b* is brought closer to the display region 31*a* of the liquid crystal display panel 10*a* than in the case where the side face 58*b* is not oblique, whereby the volume of the light guide element can be reduced, thus being more effective for cost reduction. Note that the effects of the present invention can be sufficiently attained even if the side face of the backlight device is not formed oblique in this manner.

Moreover, in the case where display devices not having backlight devices are used as the display devices, a portion of a side face of a display panel may be obliquely beveled in the manner of the side face 58*b* of the backlight device 50*b* in order to bring the display regions of the display panels closer, thereby obtaining similar effects.

Next, a construction for attaining uniform displaying will be described. First, uniformization of luminance will be described.

Among the images formed on the liquid crystal display panels 10*a* and 10*b*, the images which are formed in the peripheral display regions 32*a* and 32*b*, where the light guide elements 20*a* and 20*b* are disposed, go through the light guide elements 20*a* and 20*b* before being displayed on the viewer's side. On the other hand, the images which are formed in the central display regions 33*a* and 33*b*, which are regions of the display regions 31*a* and 31*b* other than the peripheral display regions 32*a* and 32*b*, are displayed on the viewer's side without going through the light guide elements 20*a* and 20*b*. Therefore, there will be a difference in luminance between the images which are formed in the peripheral display regions 32*a* and 32*b* and displayed through the light guide elements 20*a* and 20*b* and the images which are formed in the central display regions 33*a* and 33*b* and displayed on the viewer's side. For example, in the case where the cross-sectional length L1 of the incident face 21*a* of the light guide element 20*a* is greater than the cross-sectional length L2 of the outgoing face 22*a*, an image which is formed in the peripheral display region 32*a* will be reduced through the light guide element 20*a*. This increases the luminance. On the other hand, in the case where L1<L2, an image which is formed in the peripheral display region 32*a* will be enlarged through the light guide element 20*a*. This decreases the luminance. The cases where L3>L4 and L3<L4 are respectively similar to the cases where L1>L2 and L1<L2. Moreover, the luminance is decreased due to the aperture ratios of the light guide elements 20*a* and 20*b* (i.e., in the case where the light guide elements 20*a* and 20*b* are optical fiber face plates, the aperture ratio NA of the optical fibers) and transmission loss. This occurs irrespectively of the relative sizes of L1, L2 and L3, L4. This is another reason why a difference in luminance will occur between the regions where the light guide elements 20*a* and 20*b* are provided and the regions where the light guide elements 20*a* and 20*b* are not provided.

Such a difference in luminance can be alleviated by allowing the luminance of the images formed in the peripheral display regions 32*a* and 32*b* to differ from the luminance of the images formed in the central display regions 33*a* and 33*b*.

For example, in the case where the luminance of the images which are displayed in the regions where the light guide elements 20*a* and 20*b* are provided is lower than the luminance of the images which are displayed in the regions where the light guide elements 20*a* and 20*b* are not provided (i.e., the cases where L1<L2 and L3<L4 based on the above description), an improvement can be attained by allowing the luminance of the images formed in the peripheral display regions 32*a* and 32*b* to be higher than the luminance of the images which are formed in the central display regions 33*a* and 33*b*.

In the liquid crystal display device 100 of the present embodiment, the following two methods can be adopted:

Method a: Decrease the transmittance of the pixels which are provided in the central display regions 33*a* and 33*b*.

Method b: Increase the intensity of light which is emitted toward the peripheral display regions 32*a* and 32*b*, so as to be greater than the intensity of the light emitted toward the central display regions 33*a* and 33*b*.

Method a can be easily realized by adjusting the voltages supplied to the pixels. Method b can be realized by ensuring that the intensity of the light which is emitted from the backlight devices 50*a* and 50*b* toward the pixels arrayed in the peripheral display regions 32*a* and 32*b* is greater than the intensity of the light which is emitted toward the pixels arrayed in the central display regions 33*a* and 33*b*, for example. In the case where cold-cathode tubes are arranged as the backlight devices 50*a* and 50*b*, the cold-cathode tubes disposed corresponding to the peripheral display regions 32*a* and 32*b* may be lit brighter than the other cold-cathode tubes (the cold-cathode tubes disposed corresponding to the central display regions 33*a* and 33*b*). Moreover, a similar method is also applicable to the case where light-emitting diodes (LEDs) are arrayed as the backlight devices 50*a* and 50*b*. It will be appreciated that Methods a and b may be combined for uniformization of luminance.

In the case where the display panel is a self-light-emitting type display panel such as a plasma display panel (PDP) or an organic EL display panel (OLED), the luminance of pixels provided in the display region where the light guide elements are not disposed may be made relatively small.

In the case where the transmittance of the light guide element may vary depending on the wavelength of the light entering the light guide element, i.e., the transmitted light may change in color, color adjustment is possible by using Method a or Method b above.

Next, image uniformization will be described.

Figure 29:
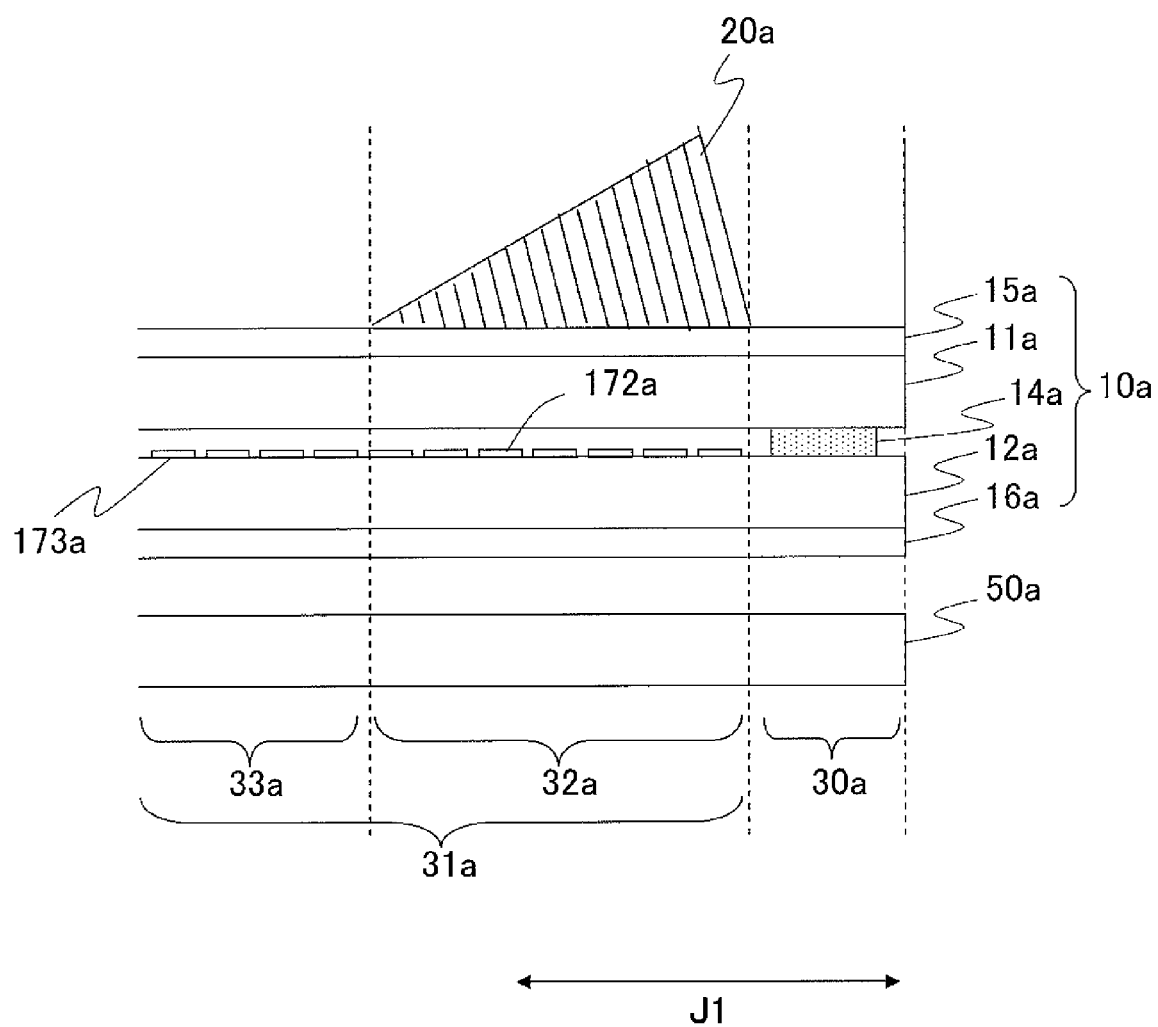
[FIG. 29] A schematic diagram for describing a method (Method 1) of displaying an image in a compressed form.
Figure 30:
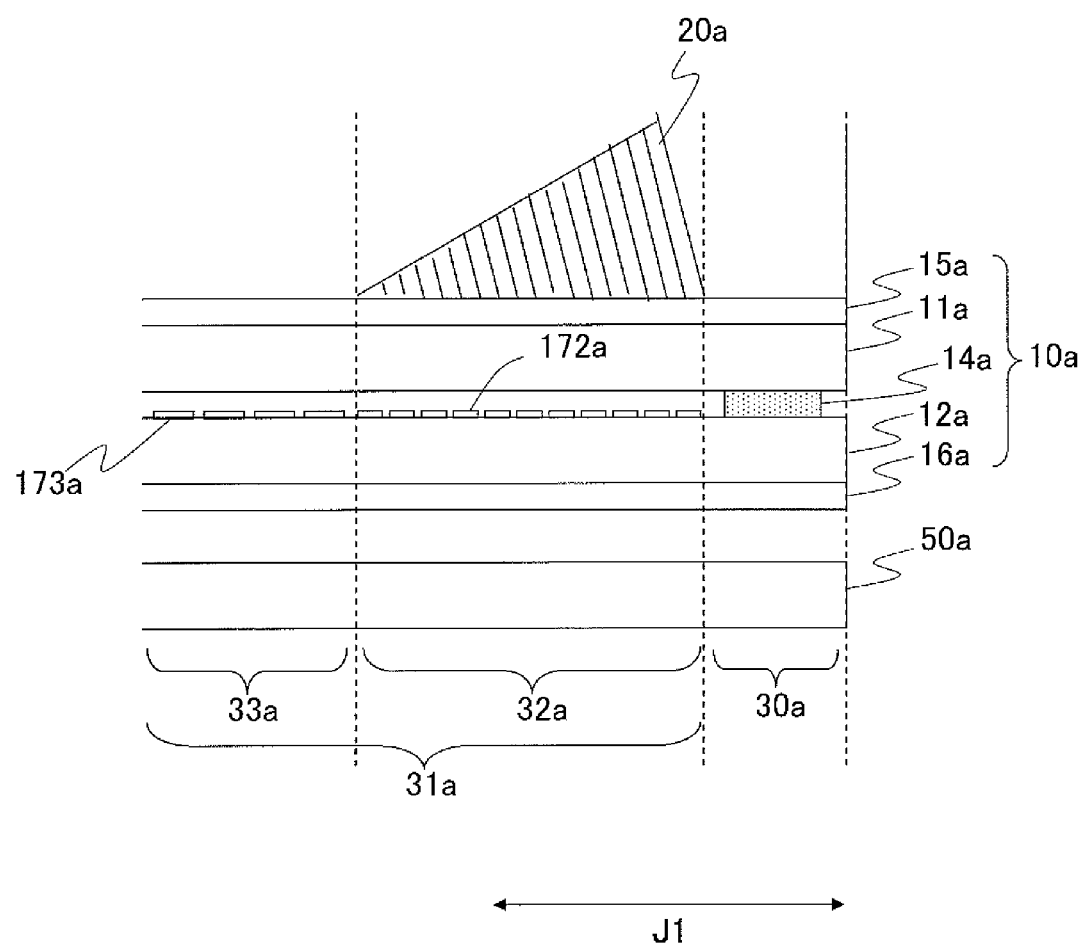
[FIG. 30] A schematic diagram for describing a method (Method 2) of displaying an image in a compressed form.

As described above, in the case where L1<L2 in the light guide element 20*a*, an image which is formed in the peripheral display region 32*a* is enlarged by the light guide element 20*a* along the first axis J1. Therefore, in order to realize proper displaying, it is preferable the image which is formed in the peripheral display region 32*a* is subjected to a previous compression relative to the image which is formed in the central display region 33*a*, in accordance with a ratio of enlargement by the light guide element 20*a*. There are following two methods of displaying an image in a compressed form. The two methods will be described with reference to FIGS. 29 and 30. FIG. 29 and FIG. 30 are schematic diagrams for explaining Methods 1 and 2 below, respectively.

Method 1: As in a liquid crystal display panel 10*a* shown in FIG. 29, a method of forming a compressed image in the peripheral display region 32*a* through signal processing, while the pitch of pixels 173*a* (pixels provided in the central display region 33*a*) and pixels 172*a* (pixels provided in the peripheral display region 32*a*) is kept constant across the entire display region 31*a* of the liquid crystal display panel 10*a* (peripheral display region 32*a*, central display region 33*a*). In other words, the display signals to be supplied to the plurality of pixels provided in the peripheral display region 32a are compressed along the first axis J1. At this time, the display signals to be supplied to the pixels 172a provided in the peripheral display region 32a are compressed in accordance with the rate of enlargement by the light guide element 20a.

Method 2: A method of, as in a liquid crystal display panel 10a shown in FIG. 30, making the pitch of the pixels 172a arrayed in the peripheral display region 32a narrower (compressed) than the pitch of the pixels 173a arrayed in the other region (central display region 33a), thus forming a compressed image without performing signal processing. Although Method 2 does not require any special signal processing, it is necessary to previously fabricate specially-designed display panels, thus resulting in problems such as poor versatility and cost.

On the other hand, Method 1 has an advantage in that commonly-used display panels can be used, although it requires signal processing. The signal processing can be implemented in software, for example. In the case where the outgoing face 22a of the light guide element 20a is a plane (its cross section is a straight line), the image will be uniformly enlarged along the first axis J1, so that the image compression and display signal compression can be performed uniformly, thus providing an advantage in that signal processing can be simplified. As in the light guide elements 220a and 220b of the display device 200B shown in FIG. 28, in the case of using a light guide element whose outgoing face is a curved surface, an image may be compressed according to the rate of enlargement by the light guide element.

With respect to the case where L1<L2 so that an image to be formed in the peripheral display region 32a is enlarged by the light guide element 20a, a method of forming an image in the peripheral display region 32a in a more compressed form than in the central display region 33a has been described above. In the case where L1>L2, an image formed in the peripheral display region 32a will be reduced by the light guide element 20a along the first axis J1, so that it is preferable that an image to be formed in the peripheral display region 32a is subjected to a previous enlargement relative to an image to be formed in the central display region 33a. A method of forming an enlarged image can be realized as a reversed method of that of the aforementioned reducing case.

As for the light guide element 20b, too, an image to be formed in the peripheral display region 32b may be reduced or enlarged along the second axis J2 by the above-described methods in the cases where L3<L4 and L3>L4, respectively.

In the liquid crystal display device 100, the shapes of the light guide elements 20a and 20b are isosceles triangular prisms. That is, cross sections of the light guide elements 20a and 20b that are perpendicular to their longitudinal directions are isosceles triangles, such that L1=L2, L3=L4. Therefore, images formed in the peripheral display regions 32a and 32b are neither enlarged nor reduced by the light guide elements 20a and 20b. Thus, there is no need for the above-described image enlargement or reduction. However, in the case where there is a conspicuous difference in luminance due to transmission losses of the light guide elements, it is preferable to alleviate the difference in luminance by the aforementioned methods as necessary. Moreover, due to the different sizes of the light guide elements 20a and 20b, a difference in luminance may occur between an image displayed on the outgoing face 22a and an image displayed on the outgoing face 22b. In that case, too, it is preferable to alleviate the difference in luminance by the aforementioned methods as necessary.

Figure 31:
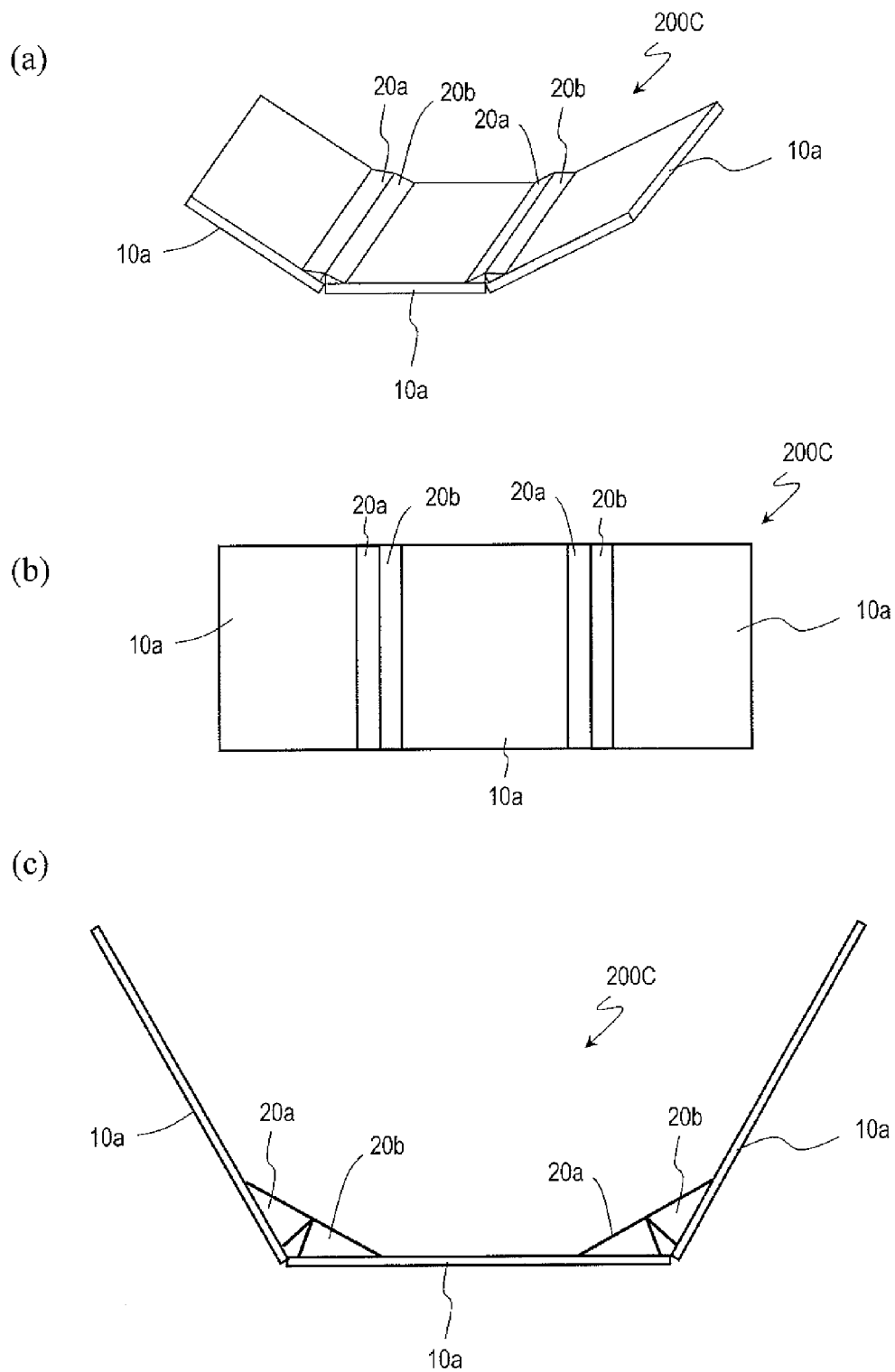
[FIG. 31] (*a*) is a schematic perspective view of another liquid crystal display device 200C according to an embodiment of the present invention; (*b*) is a schematic upper plan view of the liquid crystal display device 200C; and (*c*) is a schematic cross-sectional view of the liquid crystal display device 200C.

Although the liquid crystal display device 100 of the present embodiment includes two display panels, the liquid crystal display device 100 of the present embodiment may be applied to the case of using more display panels for tiling. For example, as in a liquid crystal display device 200C shown in FIGS. 31(a) to (c), three display panels may be used for tiling. FIG. 31(a) is a perspective view of the liquid crystal display device 200C; FIG. 31(b) is an upper plan view of the liquid crystal display device 200C; and FIG. 31(c) is a cross-sectional view of the liquid crystal display device 200C. As shown in FIGS. 31(a) to (c), in the liquid crystal display device 200C, three liquid crystal display panels 10a are disposed at angles of more than 0° but less than 180° between one another. Between two adjoining liquid crystal display panels 10a, a light guide element 20a and a light guide element 20b are disposed. Due to the provision of the light guide elements 20a and 20b, the liquid crystal display device 200C is able to realize displaying with obscured joints.

Figure 32:
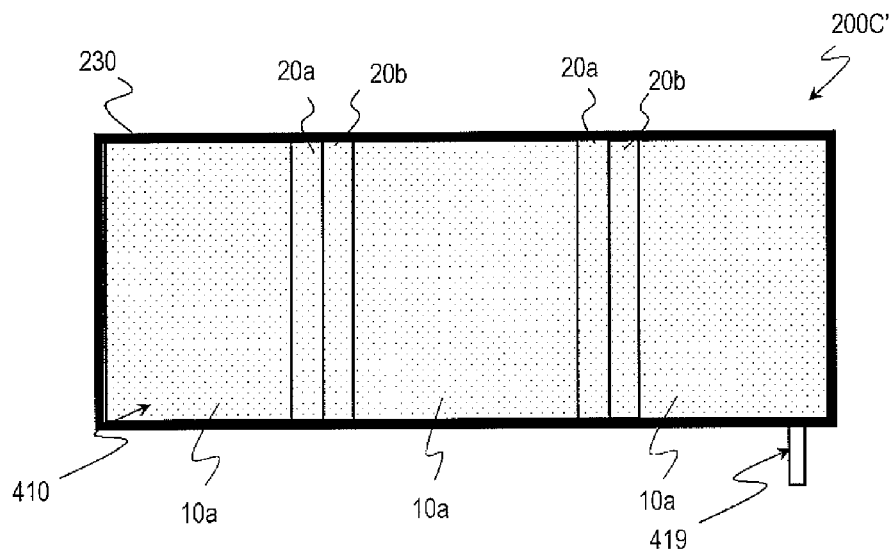
[FIG. 32] A schematic upper plan view of another liquid crystal display device 200C' according to an embodiment of the present invention.

A functional film can also be provided in the liquid crystal display device 200C having three liquid crystal display panels, as is the case with the liquid crystal display device 100. With reference to FIG. 32, a liquid crystal display device 200C' will be described in which a touch panel film 410 is provided as a functional film on the surface of a display panel unit with a similar construction to that of the liquid crystal display device 200C. As shown in FIG. 32, the light guide elements 20a and 20b are provided between adjoining liquid crystal display panels 10a of the liquid crystal display device 200C', as in the liquid crystal display device 200C, so that the joints between adjoining liquid crystal display panels 10a can be obscured. FIG. 32 also shows terminals 419 of the touch panel film 410. In the liquid crystal display device 200C', the terminals 419 of the touch panel film 410 lead out of the frame 230. The frame 230 is a portion of the frame region of the liquid crystal display panel 10a that does not constitute any joint in the overall displaying by the liquid crystal display device 200C'. In the case where a touch panel film is provided as a functional film as in the liquid crystal display device 200C', it is preferable that the terminals are allowed to lead out of a portion that does not affect displaying.

In the liquid crystal display devices 200C and 200C', the liquid crystal display panels 10a are disposed so that their edges on the viewer's side abut one another as in the liquid crystal display device 200A (FIG. 26). In the case where the frame region of one of the two adjoining liquid crystal display panels is overlapped by the side face of the other liquid crystal display panel, as in the liquid crystal display device 100, the light guide elements 20a and 20b can be downsized.

Figure 33:
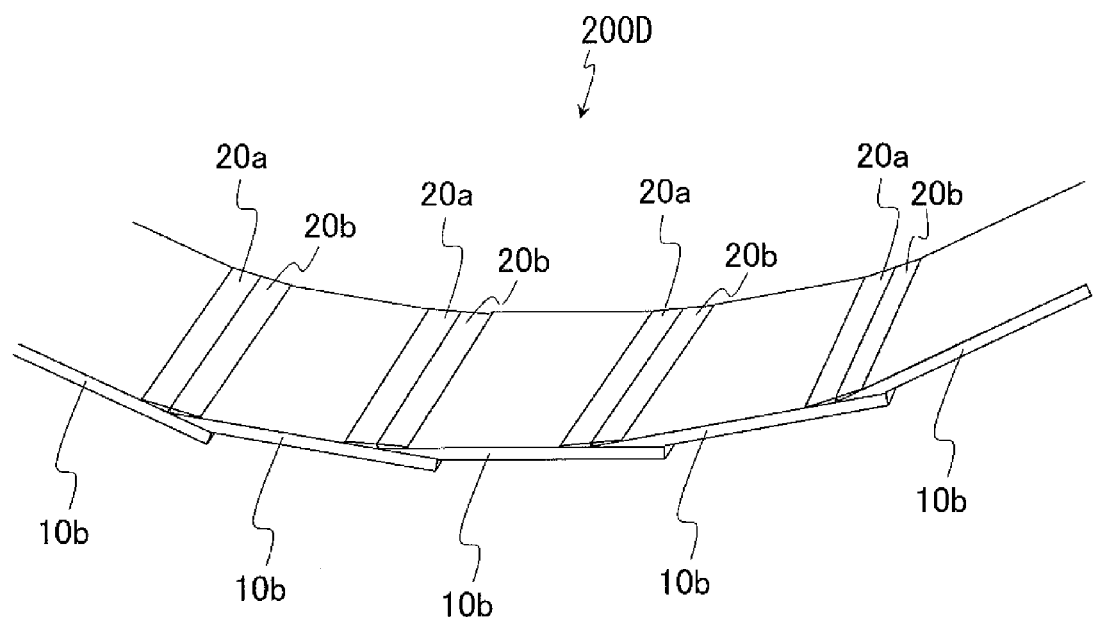
[FIG. 33] A schematic perspective view of another liquid crystal display device 200D according to an embodiment of the present invention.

Moreover, as in a liquid crystal display device 200D shown in FIG. 33, even more display panels may be used for tiling. FIG. 33 shows a perspective view of a liquid crystal display device 200D having a plurality of liquid crystal display panels. The display device 200D shown in FIG. 33 includes a plurality of liquid crystal display panels 10b, such that the liquid crystal display panels 10b adjoin one another. The frame region of one liquid crystal display panel is overlapped by a side face of another liquid crystal display panel, such that an angle between the viewer-side surface of one of every two adjoining liquid crystal display panels and the viewer-side surface of the other liquid crystal display panel is more than 0° but less than 180° (e.g., 10°). In the liquid crystal display device 200D, too, by providing light guide elements 20a and 20b at the mutually-adjoining ends of the display panels, a curved-surface type display device which displays an image with obscured joints is realized. In such a display device, too, a jointless image can be displayed by small-sized light guide elements, whereby the cost of the light guide elements is reduced.

Figure 34:
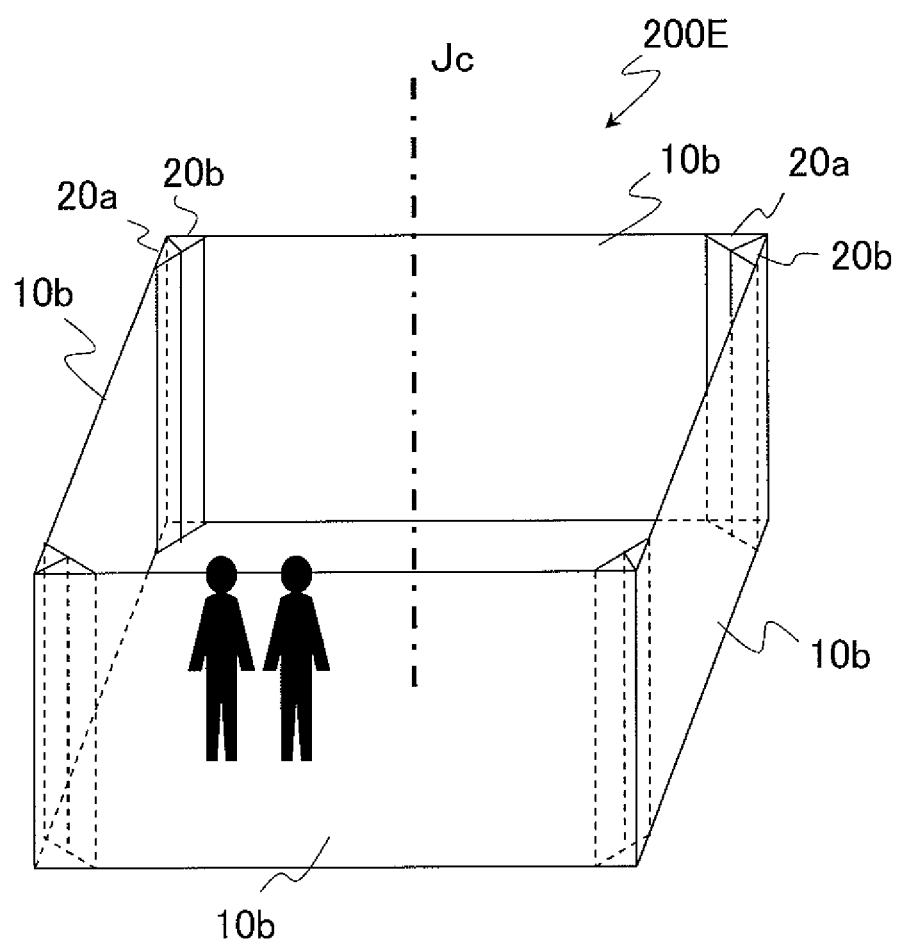
[FIG. 34] A schematic perspective view of another liquid crystal display device 200E according to an embodiment of the present invention.

Moreover, by disposing at least three display panels in an annular shape around one axis, a display device whose entire inner surface serves as a display plane can be realized. For example, in a liquid crystal display device 200E shown in FIG. 34, four liquid crystal display panels 10a are disposed in an annular shape around a center axis Jc, with light guide elements 20a and 20b being disposed at corners of the display device. Such a display device can also display a jointless image with small-sized light guide elements, thus reducing cost.

In an application of the liquid crystal display device 200E, display panels may be disposed along the inner walls of a room, with light guide elements being provided corresponding to the corners, whereby the entire inner walls of the room can be covered with a jointless display device. By covering the entire inner walls with a jointless display device, a super-reality can be realized beyond what is possible with a single display panel.

As described above, according to the present invention, by providing light guide elements in a display device having a plurality of display panels, the joint(s) between display panels can be obscured more easily and at lower cost than conventionally. In particular, in a display device in which a plurality of display panels are disposed so as to adjoin at a predetermined angle, the light guide elements can be made small, thus further reducing the cost.

Industrial Applicability

The present invention is suitably used for various direct-viewing type display devices and production methods for direct-viewing type display devices.

Reference Signs List

10a, 10b liquid crystal display panel
   11a, 11b, 12a, 12b substrate
   13a, 13b liquid crystal layer
   14a, 14b sealing portion
   15a, 15b, 16a, 16b optical film portion
   17a, 17b viewer-side surface
   18b side face of liquid crystal display panel
   20a, 20b light guide element
   21a, 21b incident face
   22a, 22b outgoing face
   23a, 23b side face
   24a, 24b end of outgoing face
   25a, 25b light shielding layer
   30a, 30b frame region
   31a, 31b display region
   32a, 32b peripheral display region
   33a, 33b central display region
   40 sheet laminate
   43 base
   44 low-refractive index resin layer
   45 laminate
   50a, 50b backlight device
   58b side face of backlight device
   61, 62 cut surface
   80 antireflection film
   82 adhesion layer
   86 gap-sealing member
   88 front face plate
   90 buffer layer
   91 flat stage
   95a, 95b, 95c, 95d, 95e air void
   100 liquid crystal display device
   J1 first axis
   J2 second axis
   θ angle defined by display panels

The invention claimed is:

1. A direct-viewing type display device comprising a plurality of display panels, having a display region and a frame region outside the display region, wherein,
the plurality of display panels include first and second display panels adjoining each other;
the frame region of the first display panel is overlapped by a side face of the second display panel, such that a viewer-side surface of the first display panel and a viewer-side surface of the second display panel constitute an angle of more than 0° but less than 180°;
first and second light guide elements are disposed on a viewer's side of peripheral display regions adjoining the frame regions of the first and second display panels, respectively;
the first and second light guide elements have an incident face, an outgoing face, and a plurality of light guiding portions formed between the incident face and the outgoing face;
a distance between the incident face and the outgoing face of the first and second light guide elements increases away from the peripheral display region and toward the frame region;
a volume of the first light guide element is larger than a volume of the second light guide element; and
the outgoing face of the first light guide element and the outgoing face of the second light guide element are covered by a functional film.

2. The display device of claim 1, further comprising an adhesion layer having a thickness of no less than 0.2 mm and no more than 1.0 mm provided between: the functional film; and the outgoing face of the first light guide element and the outgoing face of the second light guide element.

3. The display device of claim 2, wherein,
the first light guide element has a side face abutting an end of the outgoing face closer to the second display panel and an end of the incident face closer to the second display panel;
the second light guide element has a side face abutting an end of the outgoing face closer to the first display panel and an end of the incident face closer to the first display panel; and
the display device further comprises a gap-sealing member provided at a corner portion at which the side face of the first light guide element meets the side face of the second light guide element.

4. The display device of claim 2, wherein,
the first light guide element has a side face abutting an end of the outgoing face closer to the second display panel and an end of the incident face closer to the second display panel;
the second light guide element has a side face abutting an end of the outgoing face closer to the first display panel and an end of the incident face closer to the first display panel; and
the side face of the first light guide element abuts the side face of the second light guide element.

5. The display device of claim 1, further comprising a light-transmitting front face plate, wherein,
the front face plate is provided via an adhesion layer so as to cover the outgoing face of the first light guide element and the outgoing face of the second light guide element; and
the functional film is provided on the front face plate.

6. The display device of claim 5, wherein,
the front face plate is disposed so as to cover the outgoing face of the first light guide element, the outgoing face of the second light guide element, a portion of the viewer-side surface of the first display panel, and a portion of the viewer-side surface of the second display panel; and within a viewer-side surface of the front face plate, at least one of the following is a curved surface: a corner portion at which a portion disposed on the viewer's side of the first light guide element meets a portion disposed on the viewer's side of the first display panel; and a corner portion at which a portion disposed on the viewer's side of the second light guide element meets a portion disposed on the viewer's side of the second display panel.

7. A production method for a display device comprising:
(a) a step or providing a display panel unit having a first display panel, a second display panel, a first light guide element disposed on a viewer-side surface of the first display panel, and a second light guide element disposed on a viewer-side surface of the second display panel, such that an angle defined by the viewer-side surface of the first display panel and the viewer-side surface of the second display panel is more than 0° but less than 180°; and
(b) a step of, with pressure being applied, attaching a functional film onto an outgoing face of the first light guide element and an outgoing face of the second light guide element via an adhesion layer.

8. The production method for a display device of claim 7, wherein the adhesion layer is formed by using an adhesive having a viscosity of no less than 50 Pa·s and no more than 5000 Pa·s so that the adhesion layer has a thickness of no less than 0.2 mm and no more than 1.0 mm.

9. A production method for a display device comprising:
(a) a step or providing a display panel unit having a first display panel, a second display panel, a first light guide element disposed on a viewer-side surface of the first display panel, and a second light guide element disposed on a viewer-side surface of the second display panel, such that an angle defined by the viewer-side surface of the first display panel and the viewer-side surface of the second display panel is more than 0° but less than 180°;
(b) a step of providing a light-transmitting front face plate on an outgoing face of the first light guide element and an outgoing face of the second light guide element via an adhesion layer; and
(c) a step of providing a functional film on the front face plate.

\* \* \* \* \*